US007731582B2

(12) United States Patent
Randall et al.

(10) Patent No.: US 7,731,582 B2
(45) Date of Patent: Jun. 8, 2010

(54) GAMING DEVICE HAVING AN OFFER AND ACCEPTANCE GAME WITH MULTIPLE OFFERS

(75) Inventors: Dov L. Randall, Whitefield (GB); Peter Gerrard, Prestwich (GB)

(73) Assignee: IGT, Reno, NV (US)

( * ) Notice: Subject to any disclaimer, the term of this patent is extended or adjusted under 35 U.S.C. 154(b) by 1139 days.

(21) Appl. No.: 10/657,442

(22) Filed: Sep. 8, 2003

(65) Prior Publication Data

US 2005/0054413 A1 Mar. 10, 2005

(51) Int. Cl.
*A63F 13/00* (2006.01)

(52) U.S. Cl. .......................................... 463/20; 463/25

(58) Field of Classification Search ..................... 463/1, 463/9, 16, 25–29, 40–42, 20, 22; 273/138.1–2, 273/143 R
See application file for complete search history.

(56) References Cited

U.S. PATENT DOCUMENTS

| | | | |
|---|---|---|---|
| 3,633,915 | A | 1/1972 | Lippert |
| 4,448,419 | A | 5/1984 | Telnaes |
| 4,582,324 | A | 4/1986 | Koza et al. |
| 4,624,459 | A | 11/1986 | Kaufman |
| 4,669,731 | A | 6/1987 | Clarke |
| 4,695,053 | A | 9/1987 | Vazquez, Jr. et al. |
| 4,991,848 | A | 2/1991 | Greenwood et al. |
| 5,178,390 | A | 1/1993 | Okada |
| 5,205,555 | A | 4/1993 | Hamano |
| 5,342,047 | A | 8/1994 | Heidel et al. |

(Continued)

FOREIGN PATENT DOCUMENTS

| | | | |
|---|---|---|---|
| EP | 0874337 | A1 | 10/1998 |
| EP | 0926645 | A2 | 6/1999 |
| EP | 0944030 | A2 | 9/1999 |

(Continued)

OTHER PUBLICATIONS

A Vamp for All Seasons Article, written by Strictly Slots, published in 2002.

(Continued)

*Primary Examiner*—John M Hotaling, II
(74) *Attorney, Agent, or Firm*—K&L Gates, LLP

(57) ABSTRACT

A gaming device that selects one or more offer components and forms an initial offer based on the selected offer components. The gaming device enables the player to accept or reject the initial offer. If the player rejects the initial offer (and the player has at least one offer remaining), then a component number modifier generator selects one of a plurality of component number modifiers. The selected component number modifier alters or changes the number of selected offer components by either adding or subtracting at least one offer component to or from the previously selected offer components. If the selected component number modifier is associated with a negative number or value, then the gaming device deselects at least one of the previously selected offer components. The remaining selected offer components form a subsequent offer which the gaming device enables the player to accept or reject. If the selected component number modifier is associated with a positive value or number, then at least one of the offer components from the provided plurality of offer components is selected. The value or award associated with each of the additionally selected offer components is added or otherwise combined with the values of the previously selected offer components to form a subsequent offer which the gaming device enables the player to accept or reject.

61 Claims, 14 Drawing Sheets

U.S. PATENT DOCUMENTS

| | | | |
|---|---|---|---|
| 5,382,023 | A | 1/1995 | Roberts et al. |
| 5,449,173 | A | 9/1995 | Thomas et al. |
| 5,456,465 | A | 10/1995 | Durham |
| 5,524,888 | A | 6/1996 | Heidel |
| 5,536,016 | A | 7/1996 | Thompson |
| 5,542,669 | A | 8/1996 | Charron et al. |
| 5,560,603 | A | 10/1996 | Seelig et al. |
| 5,584,763 | A | 12/1996 | Kelly et al. |
| 5,611,535 | A | 3/1997 | Tiberio |
| 5,647,798 | A | 7/1997 | Falciglia |
| 5,711,525 | A | 1/1998 | Breeding |
| 5,769,716 | A | 6/1998 | Saffari et al. |
| 5,772,509 | A | 6/1998 | Weiss |
| 5,775,692 | A | 7/1998 | Watts et al. |
| 5,779,544 | A | 7/1998 | Seelig et al. |
| 5,788,573 | A | 8/1998 | Baerlocher et al. |
| 5,807,172 | A | 9/1998 | Piechowiak |
| 5,823,874 | A | 10/1998 | Adams |
| 5,833,538 | A | 11/1998 | Weiss |
| 5,848,932 | A | 12/1998 | Adams |
| 5,851,147 | A | 12/1998 | Stupak et al. |
| 5,851,148 | A | 12/1998 | Brune et al. |
| 5,855,514 | A | 1/1999 | Kamille |
| 5,873,781 | A | 2/1999 | Keane |
| 5,882,261 | A | 3/1999 | Adams |
| 5,902,184 | A | 5/1999 | Bennett et al. |
| 5,911,418 | A | 6/1999 | Adams |
| 5,919,088 | A | 7/1999 | Weiss |
| 5,947,820 | A | 9/1999 | Morro et al. |
| 5,951,397 | A | 9/1999 | Dickinson |
| 5,964,463 | A | 10/1999 | Moore, Jr. |
| 5,967,894 | A | 10/1999 | Kinoshita et al. |
| 5,980,384 | A | 11/1999 | Barrie |
| 5,984,781 | A | 11/1999 | Sunaga |
| 5,997,400 | A | 12/1999 | Seelig et al. |
| 5,997,401 | A | 12/1999 | Crawford |
| 6,004,207 | A | 12/1999 | Wilson, Jr. et al. |
| 6,015,346 | A | 1/2000 | Bennett |
| 6,019,369 | A | 2/2000 | Nakagawa et al. |
| 6,033,307 | A | 3/2000 | Vancura |
| 6,056,642 | A | 5/2000 | Bennett |
| 6,059,289 | A | 5/2000 | Vancura |
| 6,059,658 | A | 5/2000 | Mangano et al. |
| 6,062,980 | A | 5/2000 | Luciano |
| 6,068,552 | A | 5/2000 | Walker et al. |
| 6,089,976 | A | 7/2000 | Schneider et al. |
| 6,089,977 | A | 7/2000 | Bennett |
| 6,089,978 | A | 7/2000 | Adams |
| 6,093,102 | A | 7/2000 | Bennett |
| 6,102,798 | A | 8/2000 | Bennett |
| 6,113,098 | A | 9/2000 | Adams |
| 6,120,031 | A | 9/2000 | Adams |
| 6,120,378 | A | 9/2000 | Moody et al. |
| 6,126,541 | A | 10/2000 | Fuchs |
| 6,126,542 | A | 10/2000 | Fier |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,270 | A | 11/2000 | Huard et al. |
| 6,146,273 | A | 11/2000 | Olsen |
| 6,149,156 | A | 11/2000 | Feola |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,203,429 | B1 | 3/2001 | Demar et al. |
| 6,210,279 | B1 | 4/2001 | Dickinson |
| 6,213,876 | B1 | 4/2001 | Moore, Jr. |
| 6,224,482 | B1 | 5/2001 | Bennett |
| 6,224,483 | B1 | 5/2001 | Mayeroff |
| 6,227,971 | B1 | 5/2001 | Weiss |
| 6,231,442 | B1 | 5/2001 | Mayeroff |
| 6,231,445 | B1 | 5/2001 | Acres |
| 6,234,879 | B1 | 5/2001 | Hasegawa et al. |
| 6,251,013 | B1 | 6/2001 | Bennett |
| 6,261,128 | B1 | 7/2001 | Heim et al. |
| 6,261,177 | B1 | 7/2001 | Bennett |
| 6,299,165 | B1 | 10/2001 | Nagano |
| 6,302,790 | B1 | 10/2001 | Brossard |
| 6,305,686 | B1 | 10/2001 | Perrie et al. |
| 6,309,300 | B1 | 10/2001 | Glavich |
| 6,312,334 | B1 | 11/2001 | Yoseloff |
| 6,328,649 | B1 | 12/2001 | Randall et al. |
| 6,334,864 | B1 | 1/2002 | Amplatz et al. |
| 6,347,996 | B1 | 2/2002 | Gilmore et al. |
| 6,375,187 | B1 | 4/2002 | Baerlocher |
| 6,398,218 | B1 | 6/2002 | Vancura |
| 6,413,161 | B1 | 7/2002 | Baerlocher et al. |
| 6,435,511 | B1 | 8/2002 | Vancura et al. |
| 6,439,995 | B1 | 8/2002 | Hughs-Baird et al. |
| 6,461,241 | B1 | 10/2002 | Webb et al. |
| 6,464,582 | B1 | 10/2002 | Baerlocher et al. |
| 6,494,785 | B1 | 12/2002 | Gerrard et al. |
| 6,506,118 | B1 | 1/2003 | Baerlocher et al. |
| 6,514,141 | B1 | 2/2003 | Kaminkow et al. |
| 6,561,899 | B2 | 5/2003 | Vancura |
| 6,569,015 | B1 | 5/2003 | Baerlocher et al. |
| 6,575,830 | B2 | 6/2003 | Baerlocher et al. |
| 6,585,591 | B1 | 7/2003 | Baerlocher et al. |
| 6,595,854 | B2 | 7/2003 | Hughs-Baird et al. |
| 6,599,192 | B1 | 7/2003 | Baerlocher et al. |
| 6,602,137 | B2 | 8/2003 | Kaminkow et al. |
| 6,607,438 | B2 | 8/2003 | Baerlocher et al. |
| 6,620,045 | B2 | 9/2003 | Berman et al. |
| 6,632,141 | B2 | 10/2003 | Webb et al. |
| 6,648,754 | B2 | 11/2003 | Baerlocher et al. |
| 6,659,864 | B2 | 12/2003 | McGahn et al. |
| 6,692,355 | B2 | 2/2004 | Baerlocher et al. |
| 6,719,632 | B2 | 4/2004 | Palmer et al. |
| 6,722,981 | B2 | 4/2004 | Kaminkow et al. |
| 6,722,982 | B2 | 4/2004 | Kaminkow et al. |
| 6,733,386 | B2 | 5/2004 | Cuddy et al. |
| 6,758,750 | B2 | 7/2004 | Baerlocher et al. |
| 6,786,820 | B2 | 9/2004 | Gerrard et al. |
| 6,793,579 | B2 | 9/2004 | Baerlocher et al. |
| 6,796,905 | B2 | 9/2004 | Baerlocher et al. |
| 6,808,452 | B2 | 10/2004 | Baerlocher et al. |
| 6,808,454 | B2 | 10/2004 | Gerrard et al. |
| 6,811,483 | B1 | 11/2004 | Webb et al. |
| 6,852,030 | B2 | 2/2005 | Baerlocher et al. |
| 6,890,257 | B2 | 5/2005 | Baerlocher |
| 6,899,623 | B2 | 5/2005 | Baerlocher |
| 6,942,566 | B2 | 9/2005 | Baerlocher et al. |
| 6,942,567 | B2 | 9/2005 | Baerlocher et al. |
| 6,960,132 | B2 | 11/2005 | Baerlocher et al. |
| 6,966,833 | B2 | 11/2005 | Kaminkow et al. |
| 6,971,953 | B2 | 12/2005 | Gerrard et al. |
| 7,001,273 | B2 | 2/2006 | Baerlocher |
| 2002/0045475 | A1 | 4/2002 | Glavich et al. |
| 2002/0072402 | A1 | 6/2002 | Baerlocher |
| 2002/0142822 | A1 | 10/2002 | Baerlocher et al. |
| 2002/0151350 | A1 | 10/2002 | Baerlocher et al. |
| 2002/0155883 | A1 | 10/2002 | Baerlocher |
| 2002/0187827 | A1 | 12/2002 | Blankstein |

| | | | | |
|---|---|---|---|---|
| 2003/0013514 | A1 | 1/2003 | Cregan et al. | |
| 2003/0036419 | A1 * | 2/2003 | Baerlocher et al. | 463/16 |
| 2003/0036424 | A1 | 2/2003 | Baerlocher et al. | |
| 2003/0040355 | A1 | 2/2003 | Baerlocher | |
| 2003/0040360 | A1 | 2/2003 | Kaminkow | |
| 2003/0045344 | A1 | 3/2003 | Webb et al. | |
| 2003/0045348 | A1 * | 3/2003 | Palmer et al. | 463/25 |
| 2003/0045350 | A1 | 3/2003 | Baerlocher et al. | |
| 2003/0060260 | A1 | 3/2003 | Gerrard et al. | |
| 2003/0064795 | A1 | 4/2003 | Baerlocher et al. | |
| 2003/0078093 | A1 | 4/2003 | Simms et al. | |
| 2003/0087693 | A1 | 5/2003 | Baerlocher et al. | |
| 2003/0157982 | A1 | 8/2003 | Gerrard et al. | |
| 2003/0162584 | A1 | 8/2003 | Hughs-Baird et al. | |
| 2004/0009805 | A1 | 1/2004 | Baerlocher et al. | |
| 2004/0023707 | A1 | 2/2004 | Maya et al. | |
| 2004/0038729 | A1 | 2/2004 | Webb et al. | |
| 2004/0106444 | A1 | 6/2004 | Cuddy et al. | |
| 2004/0162128 | A1 | 8/2004 | Baerlocher et al. | |
| 2004/0180710 | A1 | 9/2004 | Palmer et al. | |
| 2004/0185928 | A1 | 9/2004 | Baerlocher et al. | |
| 2004/0214632 | A1 | 10/2004 | Cuddy et al. | |
| 2005/0020346 | A1 | 1/2005 | Baerlocher | |
| 2005/0032567 | A1 | 2/2005 | Baerlocher et al. | |
| 2005/0037829 | A1 | 2/2005 | Baerlocher et al. | |
| 2005/0049036 | A1 | 3/2005 | Mead | |
| 2005/0055115 | A1 | 3/2005 | Gerrard et al. | |
| 2005/0101375 | A1 | 5/2005 | Webb et al. | |
| 2005/0130729 | A1 | 6/2005 | Baerlocher et al. | |
| 2005/0187010 | A1 | 8/2005 | Baerlocher | |
| 2005/0266914 | A1 | 12/2005 | Baerlocher et al. | |
| 2006/0003837 | A1 | 1/2006 | Baerlocher et al. | |

FOREIGN PATENT DOCUMENTS

| | | | | |
|---|---|---|---|---|
| EP | 0945837 | A2 | | 9/1999 |
| EP | 0981119 | A2 | | 2/2000 |
| EP | 0984408 | A2 | | 3/2000 |
| EP | 0984409 | A2 | | 3/2000 |
| GB | 2353128 | A | * | 2/2001 |
| WO | WO 9732285 | | | 9/1997 |
| WO | WO 00/12186 | | | 3/2000 |

OTHER PUBLICATIONS

Addams Family Article written by Strictly Slots, published in 2000.
Adders and Ladders Advertisement written by Barcrest Ltd., published prior to 2000.
American Bandstand Article, written by Strictly Slots, published in 2002.
American Thunder Screen Slots published by IGT in 1998.
Big Bang Piggy Bankin Advertisement written by WMS Gaming, Inc., published prior to 2000.
Bonus Spin Red, White & Blue Advertisement written by IGT, published in 2000.
Bonus Times Article published by Bally Gaming in 2000.
By George written by IGT, published in 2002.
Caribbean Gold II Advertisement written by Aristocrat Incorporated, published in 1998.
Cash Box Advertisement & Article written by Anchor Games, Strictly Slots, published in 2000.
Cash for Life—Offer Bonus Advertisement/Lotsa Loot Advertisement/Take It or Leave It Advertisement, written by Bally Gaming, published in 2002.
Cash for Life—Triple Spin Bonus Article, written by Strictly Slots, published in 2003.
Chutes & Ladders Game Instructions written by Hasbro-Milton Bradley, published in 1999.
Deep Pockets Advertisement, written by IGT, published in 2002.
Deep Pockets Article, written by Strictly Slots, published in 2002.
Double Top Dollar Advertisement, written by IGT, published in 2003.
Double Up Poker Game Description written by IGT Undated.
Easy Street Advertisements and Articles written by Casino Data Systems, published in 2000.
Elvis Advertisement written by IGT, published in 1999.
Empire Game Advertisement written by AC Coin, published in 1996.
Fire and Fortune Article, written by Strictly Slots, published in 2001.
Fox "N" Hound Advertisement written by IGT, published in 2000.
Hollywood Advertisement, written by Shuffle Master Gaming, published in 2001.
In Between Game Description written by IGT, available prior to 2000.
Jackpot Party Advertisements and Articles written by WMS Gaming, Inc., published in 1998.
Jackpot Party Brochures and Articles written by WMS Gaming, Inc., published in 2001.
Keep Your Hat On Advertisement written by Aristocrat, published in 2001.
King Cash Slots Advertisement, written by IGT, published in 2003.
Let's Make a Deal Game Advertisement written by Bally Gaming Systems, published in 1999.
Let's Make A Deal Advertisements written by Bally Gaming/Shuffle Master Gaming, published in 2001.
Let's Make A Deal Advertisement written by Shuffle Master and IGT, published in 2001.
Little Green Men Advertisement and Article written by IGT, Strictly Slots, published in 2000.
MegaJackpots Advertisement written by IGT, published in 1998.
Money Grab Article written by Strictly Slots, published in Apr. 2001.
Money in the Bank Advertisement written by Strictly Slots Konami, published in 2001.
Monopoly Advertisements and Articles written by WMS Gaming, Inc., Strictly Slots, published in 1998, 1999, 2000.
Monopoly Party Train Article written by Strictly Slots, published in 2002.
Neon Nights written by IGT, published in 2000.
On the Money Article written by Strictly Slots, Casino Data Systems, published in Dec. 2000.
Polly and Roger Brochure published by VLC, Inc., in 2000.
Press Your Luck Advertisement, written by Shuffle Master Gaming, published in 2000.
Press Your Luck Article, written by Strictly Slots, published in 2000.
Price is Right "Cliff Hangers" Description written by www.geocities.com; members.aol.com (web site), printed Mar. 21, 2001.
Price is Right—Cliff Hangers Advertisement, written by IGT, published in 2001.
Price is Right—Showcases Description, printed from schuminweb.com (web site) on Mar. 16, 2001.
Psycho Cash Beast Advertisement, written by IGT, published in 1999.
Richard Petty Advertisement written by IGT, published in 2000.
South Park—Dodgeball Advertisement written by IGT, published in 2000.
Spell Binder Advertisement written by IGT, published in 2000.
Sphinx Advertisement written by Atronic Casino Technology, Ltd., published in 1997.
Take Your Pick Advertisement, written by IGT/Anchor Gaming, published in 1999.
Take Your Pick Article, written by Strictly Slots, published in 2001.
Three Wishes Article, written by Strictly Slots, published in 2000.
Top Cat Brochure published by WMS Gaming, Inc.
Top Dollar Game Advertisement, written by IGT, published in 1998.
Totem Pole Advertisement written by IGT, published in 1997.
Treasure Wheel/Treasure Tunnel Brochure published by Sigma Game, Inc.
Wheel of Fortune Advertisement written by IGT, published in 1998.
Wheel of Fortune Advertisement written by IGT, published in 1999.
Wheel Poker Article written by Strictly Slots (Anchor Games), published in Nov. 2000.
Winning Streak Web Site Description written by WMS Gaming Inc. (web site), printed on Mar. 21, 2001.
X Factor Brochure and Website Page published by WMS Gaming, Inc. in 1998.

* cited by examiner

GAMING DEVICE HAVING AN OFFER AND ACCEPTANCE GAME WITH MULTIPLE OFFERS

CROSS-REFERENCE TO RELATED APPLICATIONS

This application is related to the following commonly-owned co-pending patent applications: "GAMING DEVICE HAVING SEPARATELY CHANGEABLE VALUE AND MODIFIER BONUS SCHEME," Ser. No. 09/626,045; "GAMING DEVICE HAVING A BONUS ROUND WITH MULTIPLE RANDOM AWARD GENERATION AND MULTIPLE RETURN/RISK SCENARIOS," Ser. No. 09/678,989; "GAMING DEVICE HAVING AN AWARD EXCHANGE BONUS ROUND AND METHOD FOR REVEALING AWARD EXCHANGE POSSIBILITIES," Ser. No. 09/689,510; "GAMING DEVICE HAVING GRADUATING AWARD EXCHANGE SEQUENCE WITH A TEASE CONSOLATION SEQUENCE AND AN INITIAL QUALIFYING SEQUENCE," Ser. No. 09/680,601; "GAMING DEVICE HAVING A DESTINATION PURSUIT BONUS SCHEME WITH ADVANCED AND SETBACK CONDITIONS," Ser. No. 09/686,409; "GAMING DEVICE HAVING VALUE SELECTION BONUS," Ser. No. 09/684,605; "GAMING DEVICE HAVING RISK EVALUATION BONUS ROUND," Ser. No. 09/688,434; "GAMING DEVICE HAVING AN IMPROVED OFFER/ACCEPTANCE BONUS SCHEME," Ser. No. 09/966,884, "GAMING DEVICE HAVING IMPROVED OFFER AND ACCEPTANCE BONUS SCHEME," Ser. No. 09/680,630; "GAMING DEVICE HAVING IMPROVED AWARD OFFER BONUS SCHEME," Ser. No. 09/682,368; "GAMING DEVICE HAVING OFFER AND ACCEPTANCE GAME WITH HIDDEN OFFER," Ser. No. 10/160,688; "GAMING DEVICE HAVING OFFER ACCEPTANCE GAME WITH TERMINATION LIMIT," Ser. No. 09/822,711, "GAMING DEVICE HAVING OFFER/ACCEPTANCE ADVANCE THRESHOLD AND LIMIT BONUS SCHEME," Ser. No. 09/838,014, "GAMING DEVICE HAVING IMPROVED OFFER AND ACCEPTANCE GAME WITH MASKED OFFERS," Ser. No. 10/086,014; "GAMING DEVICE HAVING AN OFFER AND ACCEPTANCE SELECTION BONUS SCHEME WITH A TERMINATOR AND AN ANTI-TERMINATOR," Ser. No. 09/945,082; "GAMING DEVICE HAVING AN AWARD OFFER AND TERMINATION BONUS SCHEME," Ser. No. 09/682,428; "GAMING DEVICE HAVING AN OFFER AND ACCEPTANCE GAME WITH A PLAYER SELECTION FEATURE," Ser. No. 10/086,078; "GAMING DEVICE HAVING OFFER AND ACCEPTANCE GAME WITH A PLURALITY OF AWARD POOLS, A REVEAL FEATURE, AND A MODIFY FEATURE," Ser. No. 10/255,862; "GAMING DEVICE HAVING IMPROVED OFFER AND ACCEPTANCE BONUS SCHEME," Ser. No. 10/074,273; "GAMING DEVICE HAVING AN OFFER/ACCEPTANCE GAME WITH MULTI-OFFER SYMBOL," Ser. No. 10/245,387; "GAMING DEVICE HAVING AN OFFER/ACCEPTANCE GAME WHEREIN EACH OFFER IS BASED ON A PLURALITY OF INDEPENDENTLY GENERATED EVENTS," Ser. No. 10/244,134; "GAMING DEVICE HAVING A DESTINATION PURSUIT BONUS SCHEME WITH ADVANCED AND SETBACK CONDITIONS," Ser. No. 10/288,750; "GAMING DEVICE HAVING IMPROVED AWARD OFFER BONUS SCHEME," Ser. No. 10/290,800; "GAMING DEVICE HAVING VALUE SELECTION BONUS," Ser. No. 10/306,295; "GAMING DEVICE HAVING IMPROVED AWARD OFFER BONUS SCHEME," Ser. No. 10/318,752; "GAMING DEVICE HAVING VALUE SELECTION BONUS," Ser. No. 10/354,514; "GAMING DEVICE HAVING PLAYER-SELECTABLE AWARD DIGITS AND AWARD MODIFICATION OPTIONS," Ser. No. 10/660,281; "GAMING DEVICE HAVING A GAME WITH A MOVING DIGIT GENERATED OUTCOME," Ser. No. 11/222,914; "GAMING DEVICE HAVING AWARD MODIFICATION OPTIONS FOR PLAYER SELECTABLE AWARD DIGITS," Ser. No. 11/626,632; "GAMING DEVICE HAVING PLAYER SELECTABLE AWARD DIGITS AND AWARD MODIFICATION OPTIONS," Ser. No. 12/117,427.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one way to enhance player enjoyment and excitement.

Gaming devices having bonus games generally employ a triggering event that occurs during the base game. The triggering event temporarily stalls or halts the base game play and enables a player to enter a second, different game, which is the bonus game. The player plays the bonus game, likely receives an award and returns to the base game.

One known bonus game enables players to accept or decline multiple award offers. The TOP DOLLAR® gaming device which is manufactured and distributed by the assignee of this application, provides the player with three offers and a final award. When an offer is given, the player may accept or reject it by pushing an accept button or a reject button, respectively. If the player accepts an offer, the player receives the accepted bonus amount and the bonus round terminates. If the player declines an offer, the game generates another offer for the player. The player is automatically provided with the last selected offer if the player rejects the three previous offers. In this game, each offer can include one or more illuminated amounts. If an offer is rejected, the gaming machine terminates the illumination of such amounts and one or more amounts are illuminated to make the next offer. The previously illuminated amounts of the previous offer are not saved.

In this known offer/acceptance game, when the player rejects an offer, the player risks a current or guaranteed award for a higher value award. The game may instead provide a lower award. The game thus creates a risk for the player. Enabling a player to pick from different risk based alternatives and then enabling the player to accumulate awards or offers from the selected alternatives provides excitement and enjoyment to the player. Therefore a need exists to provide an offer/acceptance game that enables a player to weigh options and explore the consequences of selecting those options where the player may accumulate awards or offers.

SUMMARY OF THE INVENTION

The present invention relates in general to a gaming device, and more particularly to a gaming device having an offer and acceptance game with multiple sequential offers. In one embodiment of the present invention, upon the initiation of the bonus game, the gaming device indicates or provides a plurality of offer components. One or more of the offer components form each offer that is offered to the player as described in more detail below. In one embodiment, each offer component is associated with an award or value. In one embodiment, the associated award or value of one or more offer components is revealed or displayed to the player. In another embodiment, the associated award or value of one or more offer components is masked or not revealed to the player.

The gaming device also includes a plurality of component number modifiers. In one embodiment, each component number modifier modifies or changes the number or amount of offer components which will be combined to form the subsequent offer to be provided to the player. That is, the game determines the offer components of the subsequent offer by altering or changing the number or amount of offer components from the previous offer to form the subsequent offer.

In one embodiment, each component number modifier is associated with either a positive value or number, a negative value or number or zero. In one embodiment, the values or numbers associated with each component number modifier are selected from a range of values or numbers. In one embodiment, one or more of the plurality of component number modifiers are revealed. In another embodiment, one or more of the component number modifiers are masked or otherwise not initially displayed to the player.

The gaming device also provides a number of offers that the player may be offered during the play of the offer acceptance game. The number of offers provided may be predetermined, randomly determined or determined in any other suitable fashion.

Upon the initiation of the offer acceptance game of one embodiment of the present invention, one or more of the provided offer components are selected or activated. The number or amount of offer components selected or activated may be predetermined or randomly determined. Moreover, the amount or number of offer components selected may be determined based on the player's wager, determined based on an occurrence in a primary or base game or determined in any other suitable fashion.

An initial offer based on the selected or activated offer components is formed and offered to the player. The gaming device enables the player to accept or reject the initial offer. For example, if two offer components associated with values of twenty and fifteen are selected, then an initial offer of thirty-five (based on the sum of the values of the two selected offer components) is offered to the player. If the player accepts the initial offer (or the player has no offers remaining), the player is provided the initial offer and the offer acceptance game ends.

If the player rejects the initial offer (and the player has at least one offer remaining), then one of the offer component modifiers is selected. The selected component number modifier alters or changes the amount or number of selected offer components by either adding or subtracting at least one offer component to or from the rejected offer. In one embodiment, a component number modifier generator is activated. In this embodiment, the component number modifier generator generates or randomly selects one of the plurality of component number modifiers. The offer component modifier may be selected in any suitable manner.

If the selected component number modifier is associated with a negative value, then the gaming device chooses a number of the previously selected offer components (i.e., the offer components that formed the rejected offer) and deselects or deactivates the chosen offer components. In other words, the gaming device removes a number of offer components (and the value or award associated with the removed number of offer components) from the rejected offer to form another offer. The number of offer components that are chosen and deselected is based on the value or number associated with the selected component number modifier. The remaining selected offer components (if any) form a subsequent offer which the gaming device enables the player to accept or reject as described above.

For example, if the selected component number modifier is a subtract one component number modifier (i.e., a component number modifier associated with a value of negative one), then the gaming device chooses one of the previously selected offer components that formed the rejected offer and removes, deselects or deactivates the chosen offer component. For example, if the previously selected offer component associated with a value of fifteen is chosen and deselected, then a new or subsequent offer of twenty (i.e., the currently selected offer components) is offered to the player for acceptance or rejection. It should be appreciated that in one embodiment, if no offer components are remaining after the gaming device chooses and deselects a number of selected offer components and the player has at least one offer remaining, then the gaming device selects one or more offer components and forms a subsequent offer based on the selected offer components as described above. In another embodiment, if no offer components are remaining after the gaming device chooses and deselects a number of selected offer components, the gaming device resets the game of the present invention and reselects the originally selected or activated offer components or another set of activated components.

If the selected component number modifier is associated with a positive value or number, then a number or amount of the offer components from the provided plurality of offer components is selected or activated. In one embodiment, the remaining previously unselected offer components may be selected. In another embodiment, each of the provided plurality of offer components (i.e., previously selected and unselected offer components) may be selected. The number of additional offer components is selected as described above by either the gaming device or the player. The amount or number of offer components of the plurality of offer components that are selected is based on the value or number associated with the selected component number modifier. The award associated with each of the additionally selected offer components is added or otherwise combined with the awards of the previously selected offer components (i.e., the selected offer components that formed the rejected offer) to form a new or subsequent offer. As described above, the gaming device enables the player to accept or reject this new or subsequent offer.

For example, if the selected component number modifier is an add one component number modifier (i.e., a component number modifier associated with a value of positive one), then the gaming device selects one additional offer component from the plurality of offer components and combines the selected additional offer component with the previously selected offer components to form a new or subsequent offer. For example, if an additional offer component with an associated award of five is selected, then that selected additional offer component is combined with the previously selected offer components (i.e., the selected offer components that formed the rejected offer of thirty-five) to form a new or subsequent offer of forty. The offer acceptance game proceeds as described above until the player either accepts an offer or the player has no offer remaining, in which case the last offer is provided to the player and the game ends.

In an alternative embodiment, one or more of the component number modifiers functions to change a number or amount of the previously selected offer components. That is, a number or amount of previously selected offer components are selected and replaced with newly selected offer components, wherein the number of replaced offer components is based on the number associated with the selected component number modifier. In other words, unlike the embodiments described above wherein a number of previously selected offer components are added or subtracted to form a subsequent offer, in this embodiment, the number of offer components that forms the subsequent offer will remain the same, but a number of the offer components will be changed or replaced with different, previously unselected offer components. In application, a number (based on the number associated with the selected component number modifier) of the previously selected offer components are chosen and deselected as described above regarding a component modifier which is associated with a negative number. This is followed by the selection of a number (based on the number associated with the selected component number modifier) of the remaining or unselected plurality of offer components as described above regarding a component modifier which is associated with a positive number. The award associated with each of the currently selected offer components are combined to form a new or subsequent offer. In one embodiment, one of the component number modifiers is a change all modifier which functions to replace each of the previously selected offer components with new, previously unselected offer components. The gaming device enables the player to accept or reject this subsequent offer and the game proceeds as described above.

The offer and acceptance game of the present invention provides a player with a new and exciting game that enables a player to weigh options and explore the consequences of selecting those options where the player may accumulate awards or offers.

Additional features and advantages of the present invention are described in, and will be apparent from, the following Detailed Description of the Invention and the figures.

DETAILED DESCRIPTION OF THE INVENTION

Figure 1A:
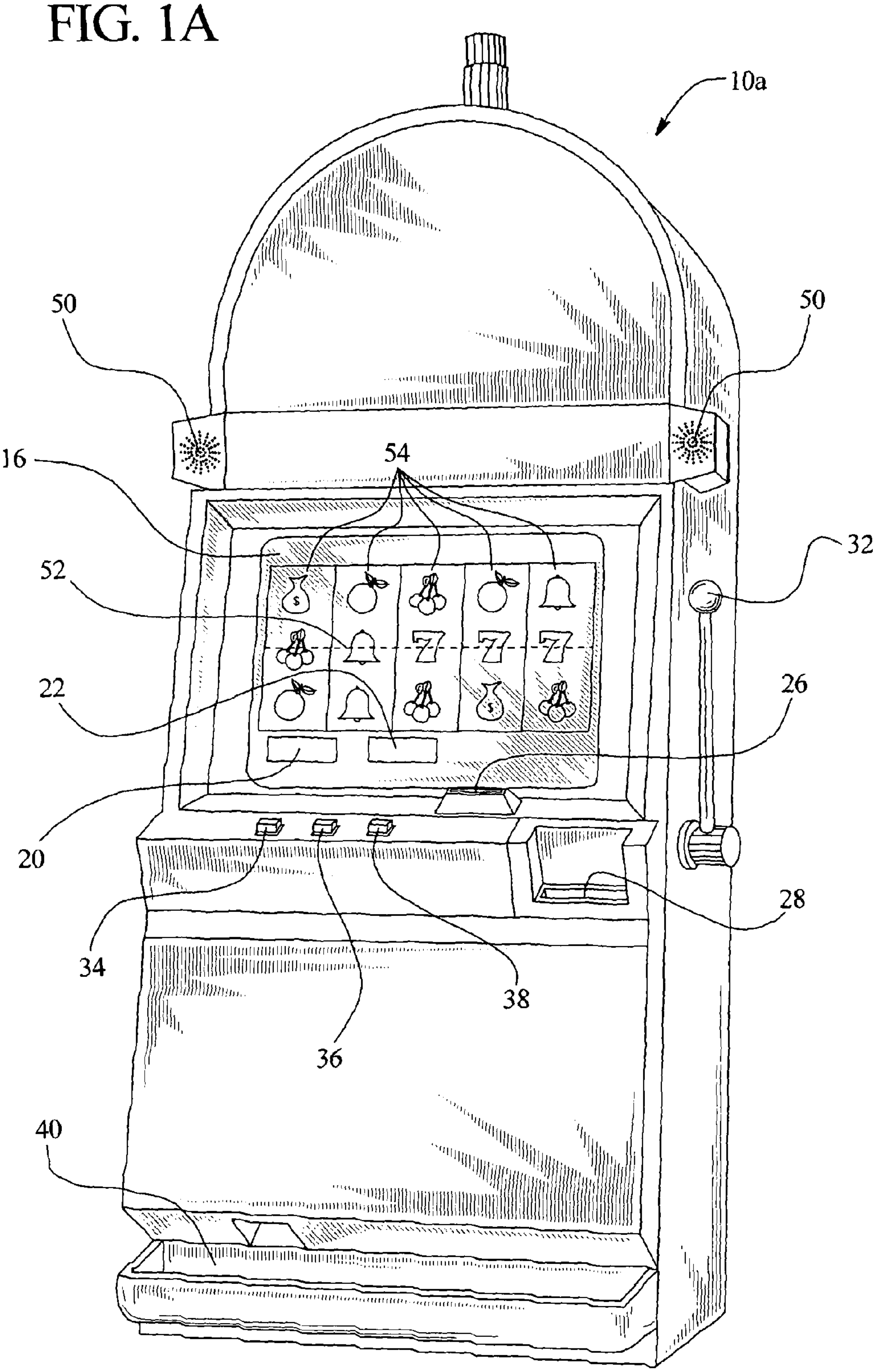
FIG. 1A is a front-side perspective view of one embodiment of the gaming device of the present invention.
Figure 1B:
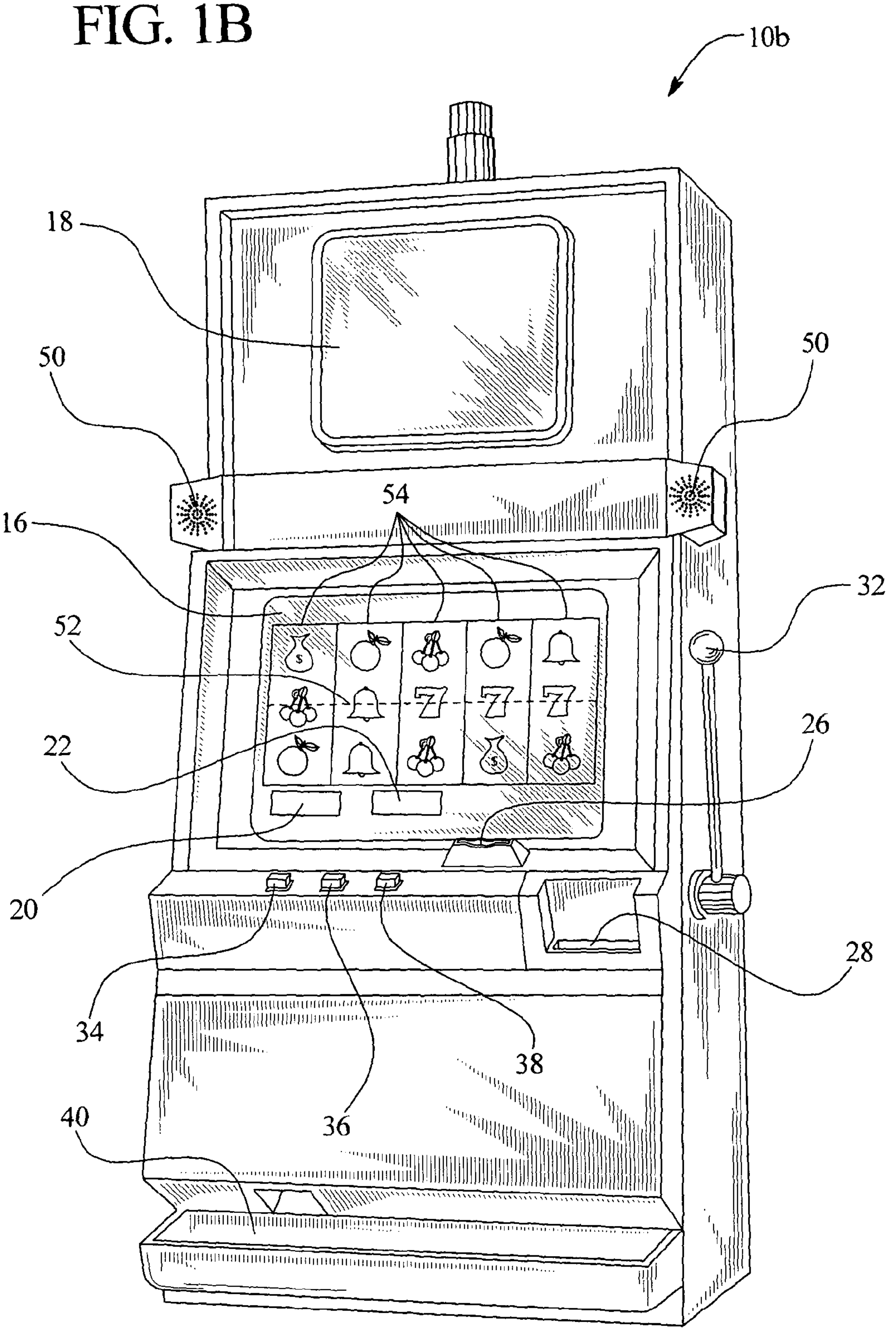
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
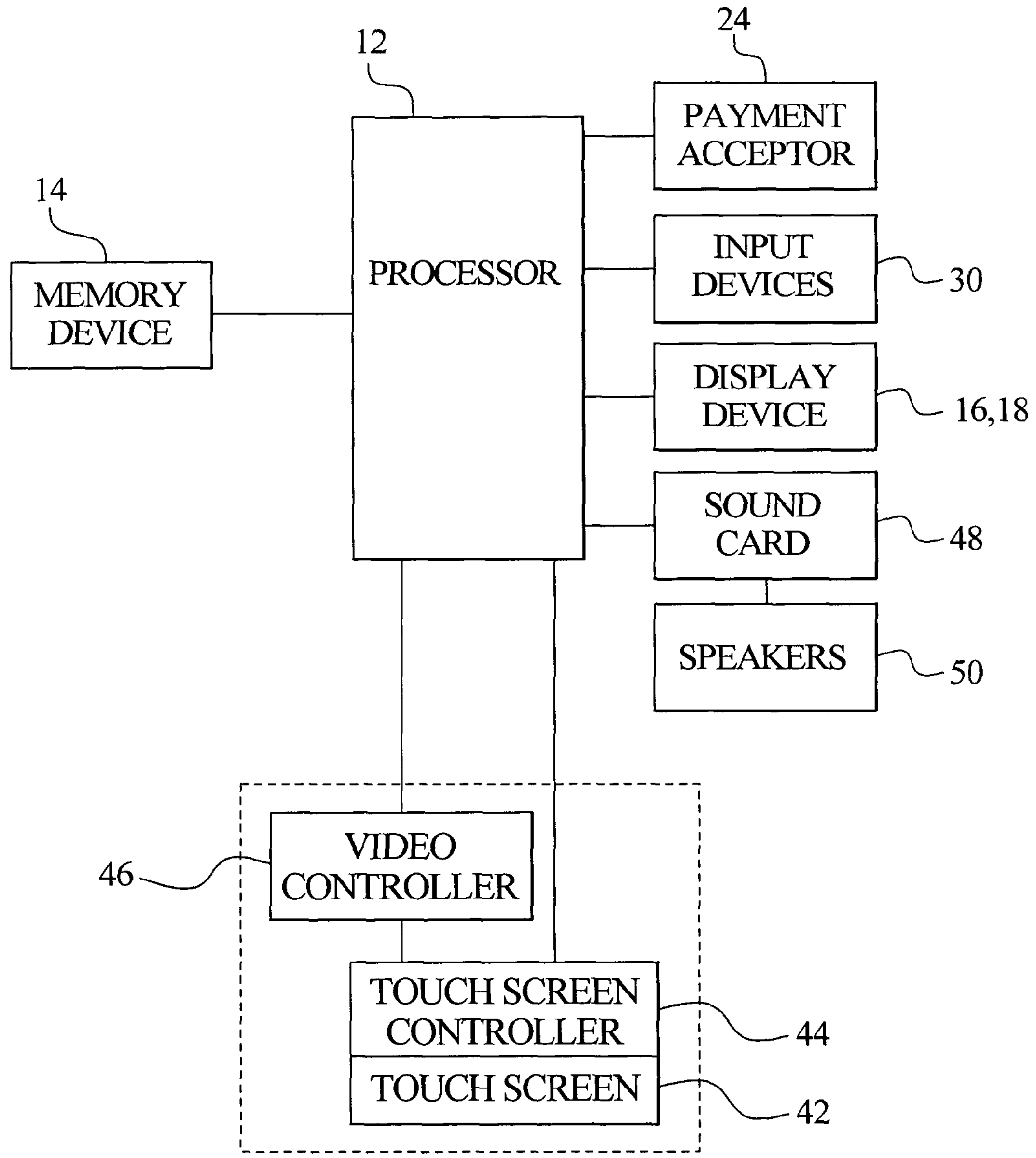
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of games or other suitable images, symbols and indicia such as any visual representation or exhibition of the movement of objects such as mechanical, virtual or video reels and wheels, dynamic lighting, video images and images of people, characters, places, things and faces of cards, tournament advertisements, promotions and the like.

In one alternative embodiment, the symbols, images and indicia displayed on or by the display device may be in mechanical form. That is, the display device may include any suitable electromechanical device which preferable moves one or more mechanical objects, such as one or more mechanical rotatable wheels, reels or dice, configured to display at least one and preferably a plurality of games or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips which are redeemable by a cashier or funded to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display device may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

The gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one reel and preferably a plurality of reels 54, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning combination or pattern.

In one embodiment, a base or primary game may be a poker game wherein the gaming device enables the player to play a conventional game of video poker and initially deals five cards, all face up, from a virtual deck of fifty-two cards. Cards may be dealt as in a traditional game of cards or in the case of the gaming device, the cards may be randomly selected from a predetermined number of cards. If the player wishes to draw, the player selects the cards to hold by using one or more input devices, such as pressing related hold buttons or touching a corresponding area on a touch-screen. After the player presses the deal button, the processor of the gaming device removes the unwanted or discarded cards from the display and deals replacement cards from the remaining cards in the deck. This results in a final five-card hand. The processor of the gaming device compares the final five-card hand to a payout table which utilizes conventional poker hand rankings to determine the winning hands. Award based on a winning hand and the credits wagered is provided to the player.

In another embodiment, the base or primary game may be a multi-hand version of video poker. In this embodiment, the player is dealt at least two hands of cards. In one such embodiment, the cards in all of the dealt hands are the same cards. In one embodiment each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferably a plurality of the selectable indicia or numbers by using an input device or by using the touch-screen. The gaming device then displays a series of drawn numbers to determine an amount of matches, if any, between the player's selected numbers and the gaming device's drawn numbers. The player is provided an award, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program code which causes the processor to automatically begin a bonus round when the player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be triggered by exceeding a certain amount of game play (number of games, number of credits, amount of time), earning a specified number of points during game play or as a random award.

In one embodiment, once a player has qualified for a bonus game, the player may subsequently enhance their bonus game participation by returning to the base or primary game for continued play. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game. The player must win or earn entry through play of the primary game, thereby encouraging play of the primary game. In another embodiment, qualification of the bonus or secondary game could be accomplished through a simple "buy in" by the player if, for example, the player has been unsuccessful at qualifying for the bonus game through other specified activities.

Figure 2B:
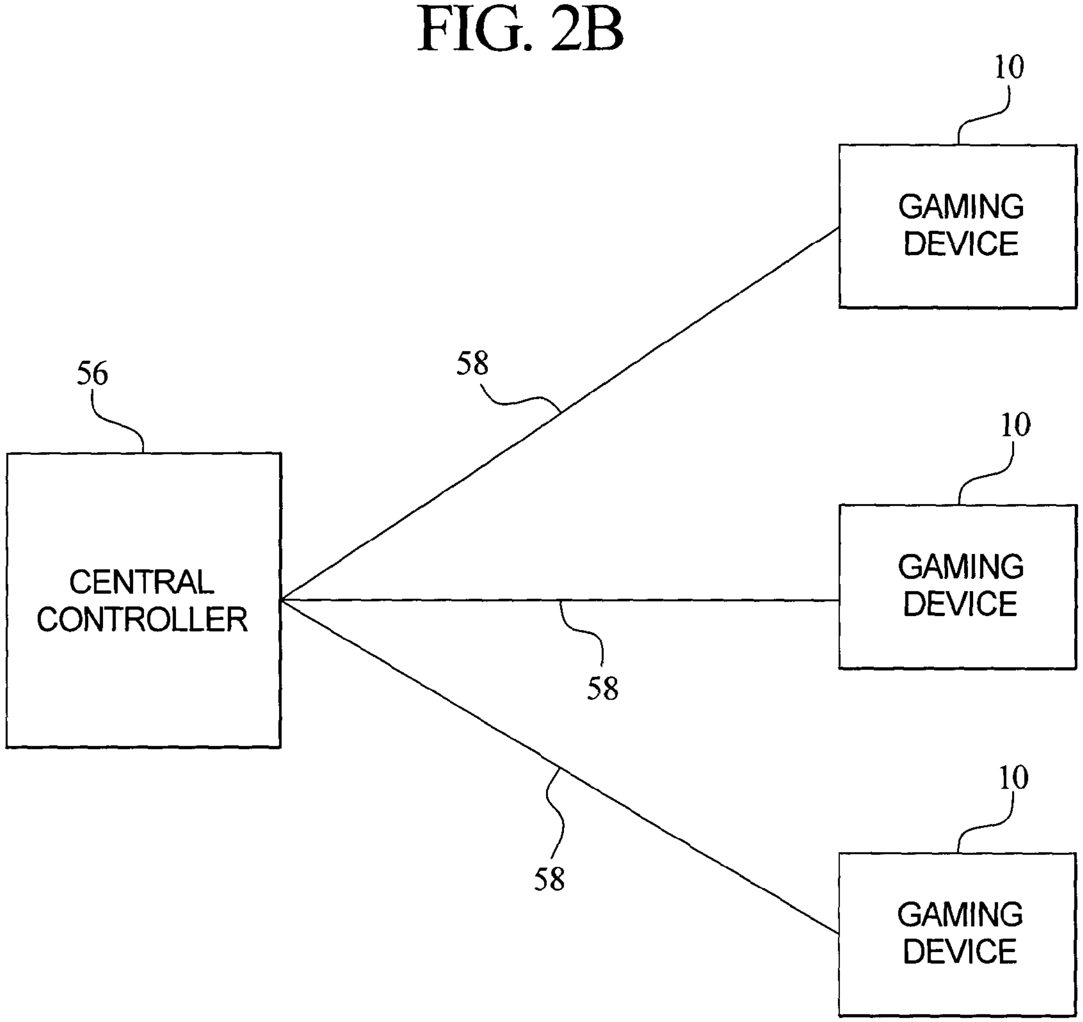
FIG. 2B is a schematic block diagram illustrating a plurality of gaming terminals in communication with a central controller.

In one embodiment, as illustrated in FIG. 2B, one or more of the gaming devices 10 of the present invention may be connected to a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server or webserver) through a conventional phone or other data transmission line, digital signal line (DSL), T-1 line, coaxial cable, fiber optic cable, wireless gateway or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Offer-Acceptance Game

Figure 3A:
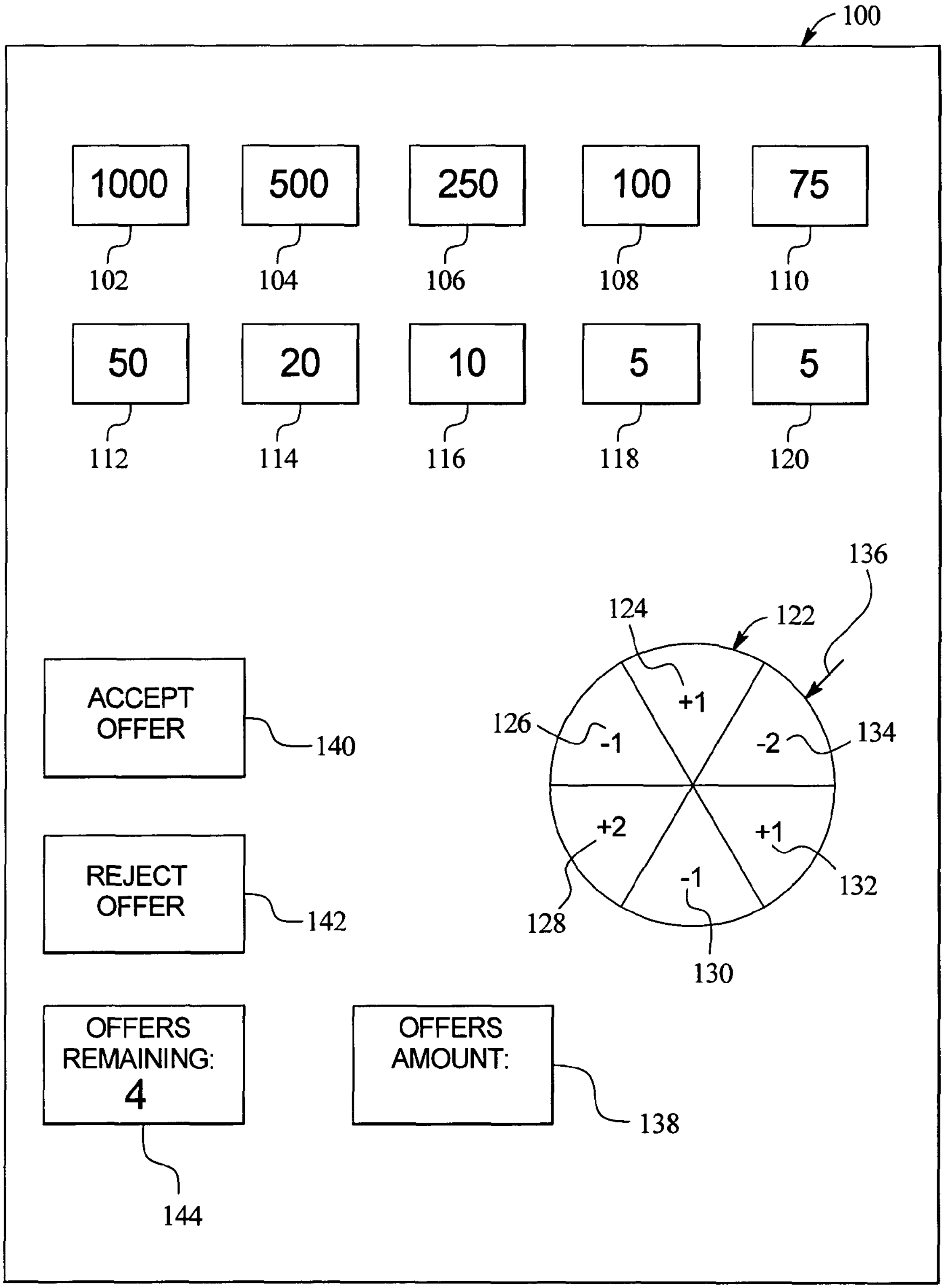
FIGS. 3A, 3B, 3C, 3D, 3E, 3F and 3G are front elevational views of one embodiment of the present invention illustrating a player obtaining a plurality of offers wherein each offer is based on a plurality of selected offer components and a plurality of component number modifiers.

Referring now to FIG. 3A, in one embodiment of the present invention, the gaming device provides a screen or display 100 which enables a player to make selections to obtain or to be offered one or more offers. The gaming device indicates or provides a plurality of offer components 102 through 120. In one embodiment, each of the offer components is associated with an award or value. In one embodiment, the award or value associated with each offer component is revealed or displayed to the player. In an alternative embodiment, one or more of the associated awards or values are masked or otherwise not displayed to the player. In one embodiment, the associated awards or values are randomly determined each time the offer-acceptance game is initiated. In one embodiment, the awards or values are selected from a range of awards or values. In an alternative embodiment, the awards or values are selected from one or more predetermined pools of awards or values. In one embodiment, once an award or value is associated with one of said offer components, said award or value is not associated with another offer component. In another embodiment, the same award or value can be associated with a plurality of offer components.

As illustrated in FIG. 3A, the gaming device includes a plurality of component number modifiers 124, 126, 128, 130, 132 and 134. In one embodiment, each component number modifier modifies or changes the number or amount of offer components which will be combined to form the subsequent offer to be provided to the player. That is, the game determines the offer components of the subsequent offer by altering or changing the number or amount of offer components from the previous offer to form the subsequent offer.

In one embodiment, each component number modifier is associated with a value or number. In one embodiment, the values or numbers associated with each component number modifiers are revealed to the player. In an alternative embodiment, one or more of the associated values or numbers are masked or otherwise not displayed to the player. In one embodiment, the associated value or number for each component number modifier is selected from a range of values or numbers. In one embodiment, the associated value or number for each component number modifier may be a positive value, a negative value or zero.

In one embodiment, the gaming device includes a component number modifier generator 122 which is operable to generate or select and display one or more of the plurality of offer component modifiers. In one embodiment, the component number modifier generator is a simulated or electromechanical rotatable wheel which has a plurality of component number modifiers and an indicator 136 such as an arrow or pointer. The wheel may be any suitable wheel as known to one of ordinary skill in the art. In this embodiment, the wheel spins or rotates and the component number modifier that the indicator indicates is the generated or selected component number modifier. In another embodiment, the wheel remains fixed (or is displayed as fixed) and the indicator rotates or spins (or is displayed to spin) around the wheel to generate or select a component number modifier. In another embodiment, the component number modifier generator generates or selects one of said plurality of component modifiers in any suitable manner such as through illumination of the modifier. The component number modifier can alternatively be displayed on one or more reels or any other suitable device.

In an alternative embodiment (not shown), each of the plurality of component number modifiers is associated with a masked selections. In this embodiment, the gaming device enables the player to select one or more of the plurality of masked selections to obtain a component number modifier. In another embodiment, the component number modifier generator may be an electromechanical or simulated die, an electromechanical or simulated reel or wheel, cards or any other suitable mechanism operable to generate or select a component number modifier.

As illustrated in FIG. 3A, the present invention also includes an accept offer indicator or selector 140, a reject offer indicator or selector 142 and an offer amount display 138 which displays the current offer amount offered to the player. The gaming device further includes an offers remaining display 144 that displays the number of remaining offers that may be provided to the player. This number corresponds to the number of times the player can reject an offer and be offered another offer. In one embodiment, upon the triggering of the offer acceptance game, the gaming device provides the player with a number of potential offers. In one embodiment, this number is randomly determined. In another embodiment, this offer is predetermined. In another embodiment, this number is determined based on the player's wager, an occurrence in the primary wagering game or the triggering event that initiated the offer acceptance game.

Figure 3B:
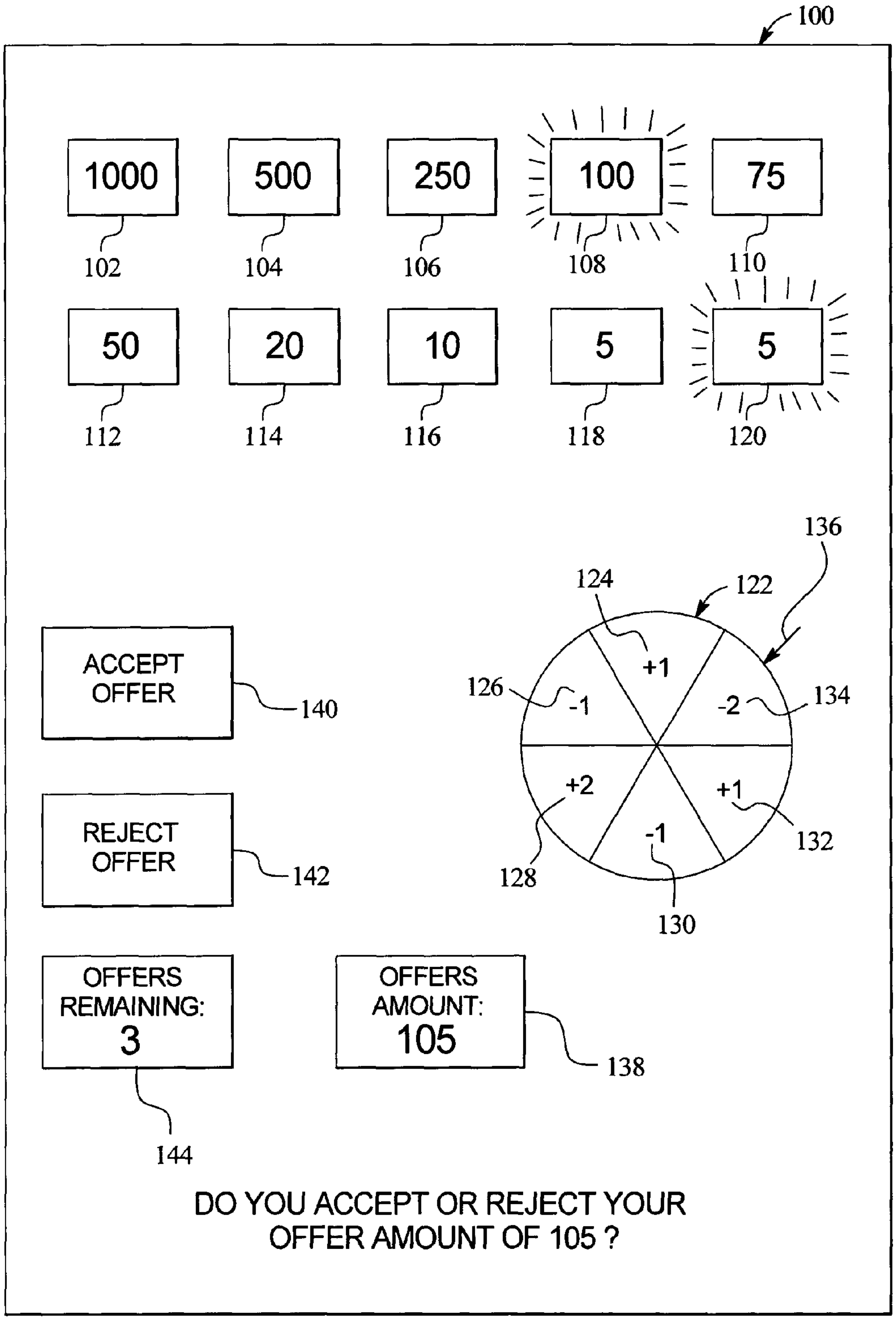

Referring to FIG. 3B, upon the initiation of one embodiment of the offer acceptance game of the present invention, one or more of the offer components are initially picked or selected. In this embodiment, highlighted offer component 108 which is associated with a value of one-hundred and highlighted offer component 120 which is associated with a value of five are initially selected by the gaming device. An initial offer of one-hundred and five which is based on these selected or activated offer components is formed and displayed in the offer amount display 138. The number of offers remaining 144 is reduced by one from four to three to reflect the formed offer. The initial offer is offered to player for acceptance or rejection and appropriate messages such as "DO YOU ACCEPT OR REJECT YOUR OFFER AMOUNT OF 105?" are preferably provided to the player visually or through suitable audio or audiovisual displays.

In one embodiment, the number of offer components initially picked or selected is predetermined. In another embodiment, the number of offer components initially picked or selected is randomly determined. In another embodiment, the number of offer components initially picked or activated is determined based on the player's wager, an occurrence in the primary wagering game or the triggering event that initiated the offer acceptance game.

In one embodiment, the gaming device randomly selects or activates one or more of the plurality of offer components. In another embodiment, each of the plurality of offer components is associated with a probability of being selected and the gaming device selects or activates one or more of the offer components based on the associated probabilities. In one embodiment, the greater the award or value associated with the offer component, the lower the associated probability of being selected. In another embodiment, each of the offer components is associated with the same probability and thus each offer component has an equal chance of being selected. In another embodiment, the gaming device enables the player to select or pick one or more of the offer components. In this embodiment, it is preferable that the awards or values associated with one or more of the offer components are masked to prevent the player from knowing which offer component they are selecting and thus picking the offer components associated with the highest awards or values.

Figure 3C:
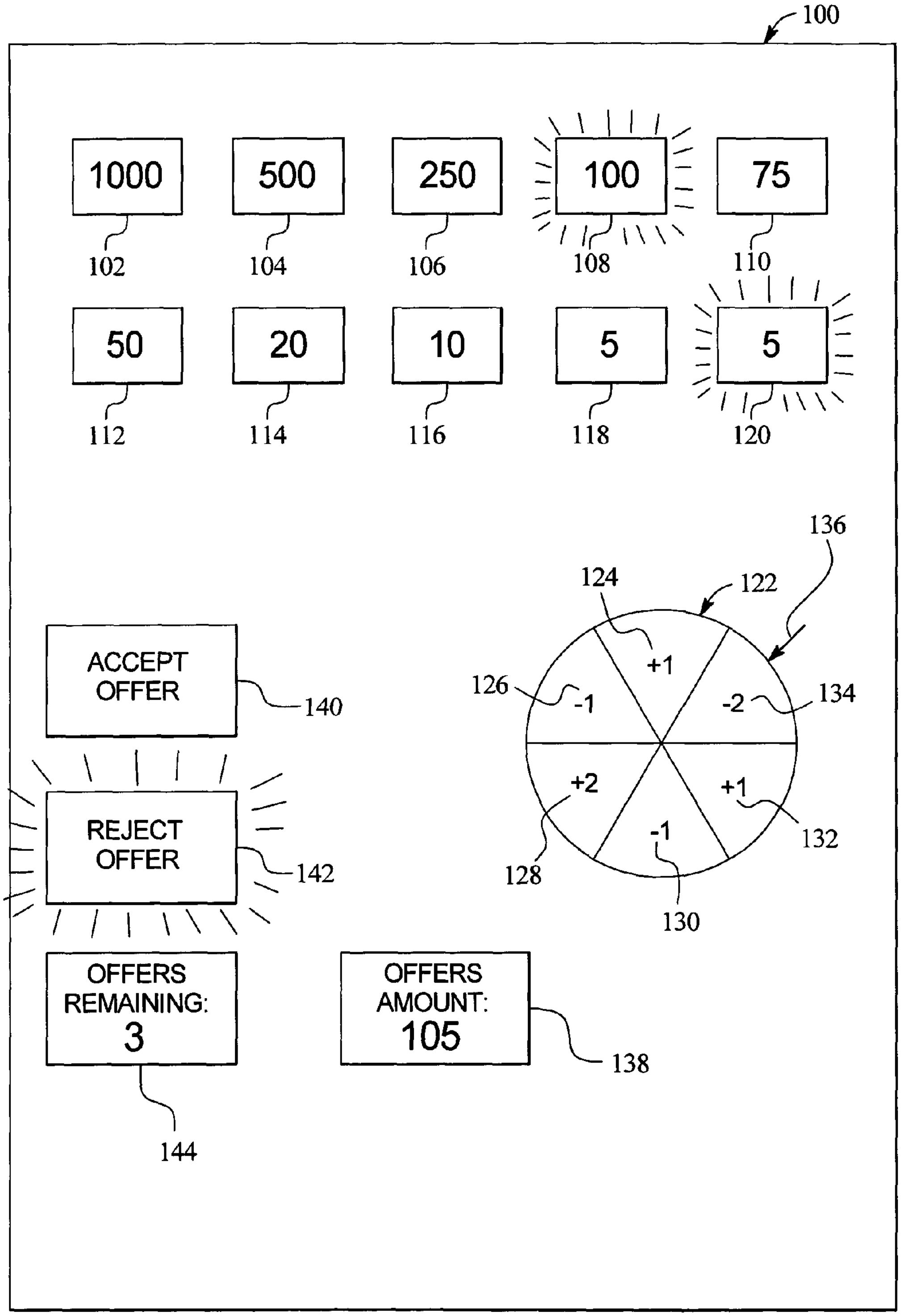
Figure 3D:
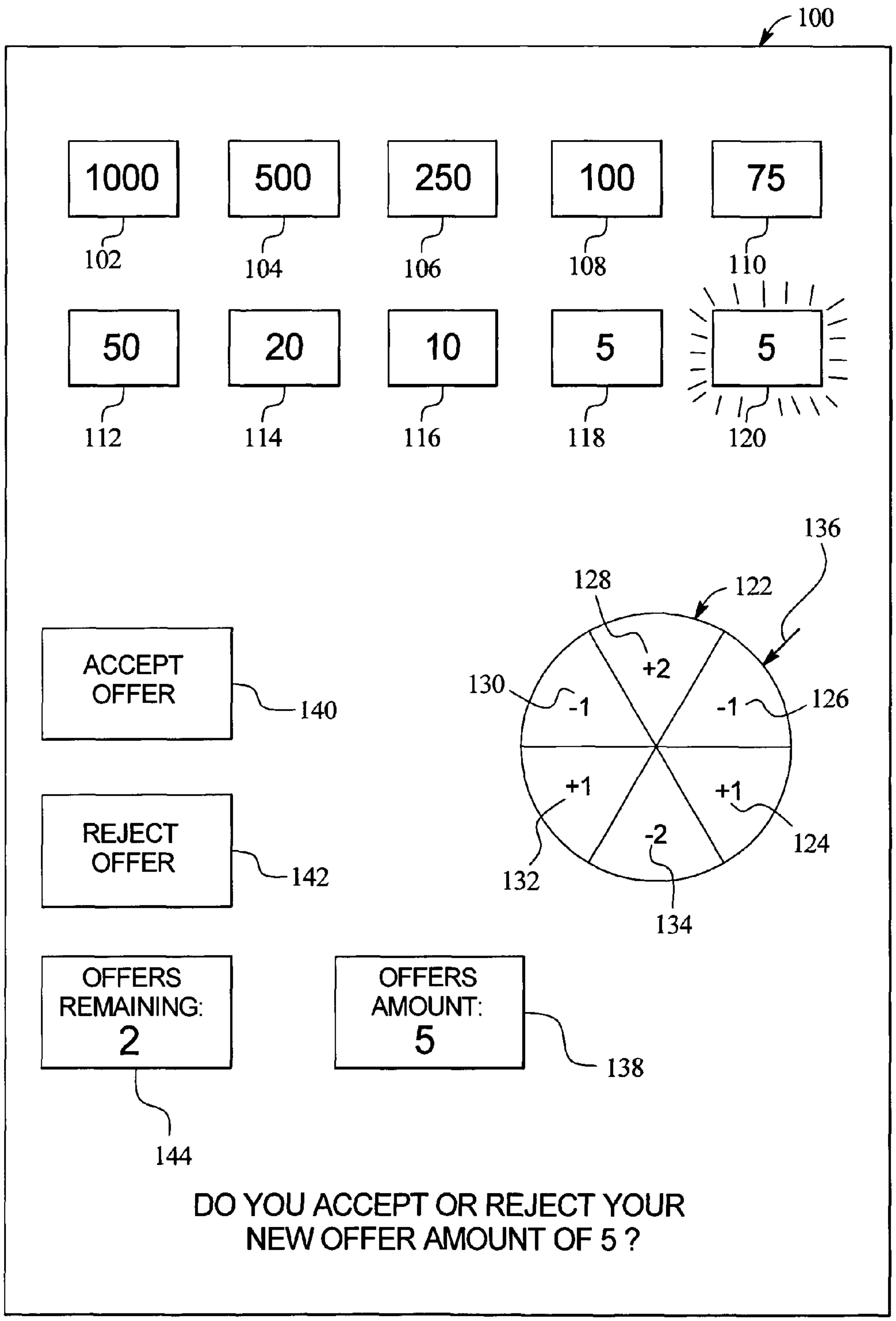

As illustrated in FIGS. 3C and 3D, the player selected the highlighted reject offer selector 142 to reject the initial offer. As the rejected offer is not the last offer (i.e., the player has at least one offer remaining), one of said plurality of component number modifiers is selected. If the rejected offer is the last offer, the gaming device provides the player the amount of the rejected offer, a consolation award or no award and the offer acceptance game ends.

In one embodiment, one of said plurality of component number modifiers is randomly selected. In another embodiment, each component number modifier is associated with a probability of being selected and is selected based on the associated probabilities.

In one embodiment, the gaming device automatically activates the component number modifier generator. In another embodiment, the component number modifier generator is activated based upon one or more inputs by the player.

As illustrated in FIG. 3D, the component number modifier generator 122 generated or selected the component number modifier 126 which is associated with a value of negative one. Since the component number modifier is associated with a value of negative one, one of the previously selected offer components is chosen and deselected. In other words, the gaming device chooses one of the previously selected offer components (i.e., the selected offer components that formed the rejected offer) and deselects the chosen offer component. In one embodiment, once an offer component is deselected, it cannot be reselected in a subsequent selection during the same offer acceptance game. In another embodiment, a previously deselected offer component can be reselected during the same offer acceptance game. A new or subsequent offer which is based on the currently selected or activated offer components is offered to the player for acceptance or rejection. In this case, the previously selected offer component 108 with an associated value of one-hundred is deselected or deactivated. A subsequent offer of five is formed based on the currently selected offer components (i.e., the previously selected offer component 120) and displayed in the offer amount display 138. The subsequent offer is offered to player for acceptance or rejection and appropriate messages such as "DO YOU ACCEPT OR REJECT YOUR OFFER AMOUNT OF 5?" are preferably provided to the player visually or through suitable audio or audiovisual displays. The number of offers remaining 144 is reduced by one from three to two to reflect the formed offer.

In one embodiment, if no offer components are remaining or are activated after the gaming device chooses and deselects or deactivates a number of selected offer components and the player has at least one offer remaining, then the gaming device selects or activates one or more offer components and forms a subsequent offer based on the selected offer components as described above. For example, if the selected offer component modifier is associated with a value of negative two but only one offer component is currently activated, then the gaming device will select one or more offer components and form a subsequent offer based on these selected offer components. In another embodiment, if no offer components are remaining after the gaming device chooses and deselects or deactivates a number of selected offer components, the gaming device resets the game of the present invention and reselects or reactivates the originally selected or activated offer components or alternatively a new set of offer components.

Figure 3E:
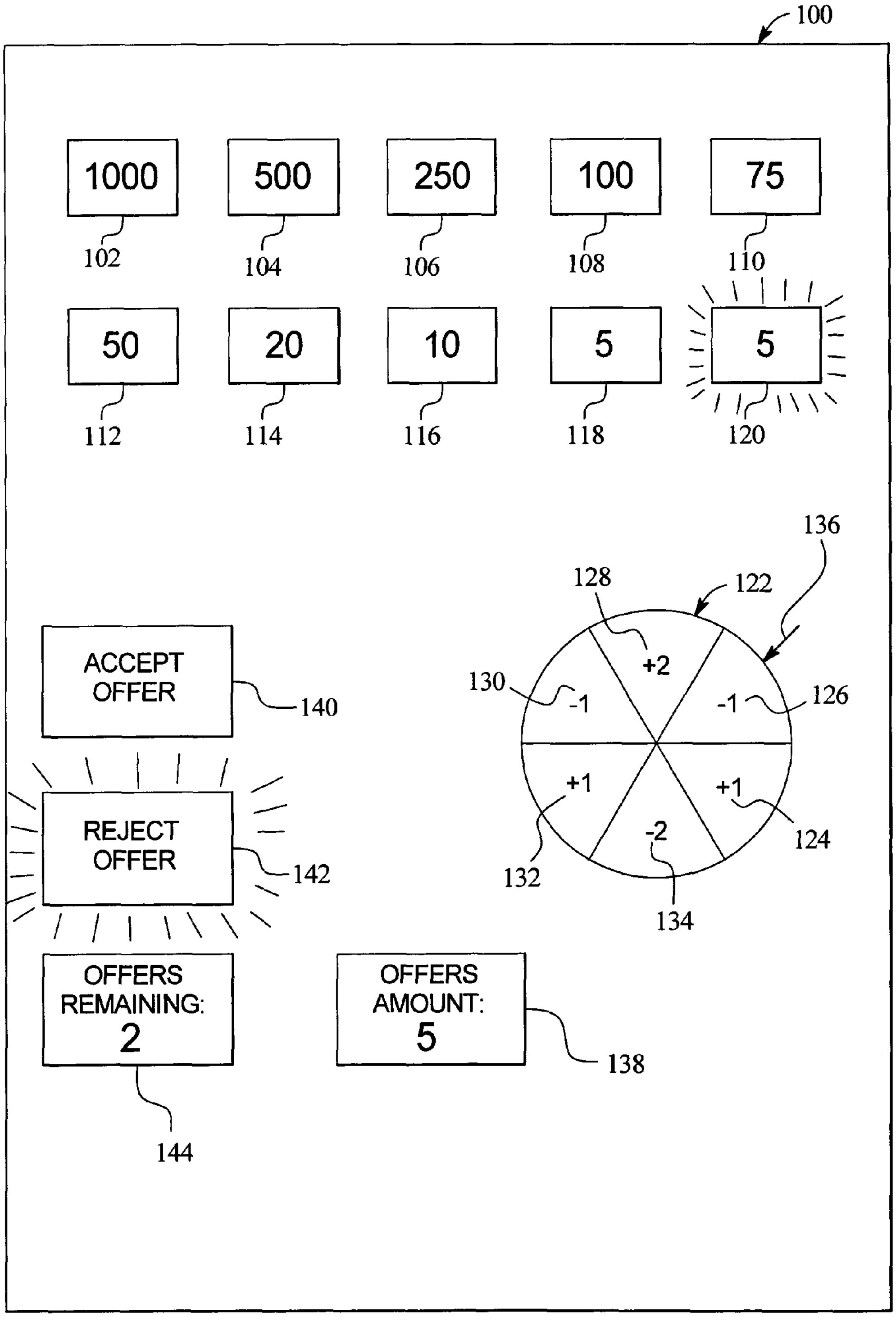
Figure 3F:
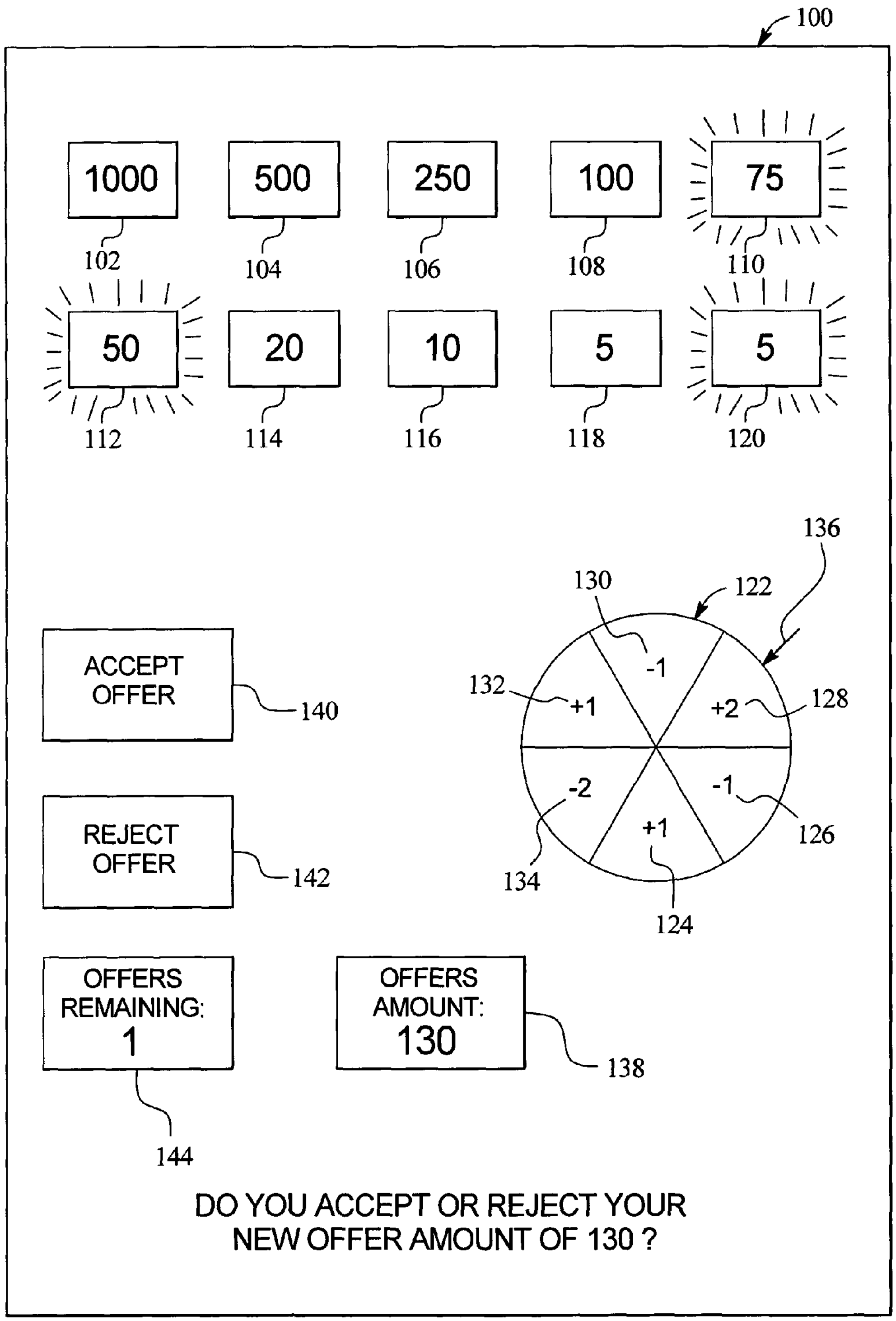

As illustrated in FIG. 3E, the player selected the highlighted reject offer selector 142 to reject the subsequent offer amount of five. As the rejected offer is not the last offer (i.e., the player has at least one offer remaining), the component number modifier generator 122 is again activated to generate or select one of said plurality of component number modifiers. As illustrated in FIG. 3F, the component number modifier generator 122 generated or selected the component number modifier 128 which is associated with a value of positive two. Since the component number modifier is associated with a value of positive two, two of the remaining or unselected plurality of offer components are selected and the award or value associated with the selected offer components is combined with the previously selected offer components. A subsequent offer which is based on the currently selected offer components is offered to the player for acceptance or rejection. In this case, highlighted offer component 110 which is associated with a value of seventy-five and highlighted offer component 112 which is associated with a value of fifty were generated by the component number modifier generator. A subsequent offer of one-hundred thirty is formed based on the currently selected or highlighted offer components and displayed in the offer amount display 138. The subsequent offer is offered to player for acceptance or rejection and appropriate messages such as "DO YOU ACCEPT OR REJECT YOUR OFFER AMOUNT OF 130?" are preferably provided to the player visually or through suitable audio or audiovisual displays. The number of offers remaining 144 is reduced by one from two to one to reflect the subsequent offer.

Figure 3G:
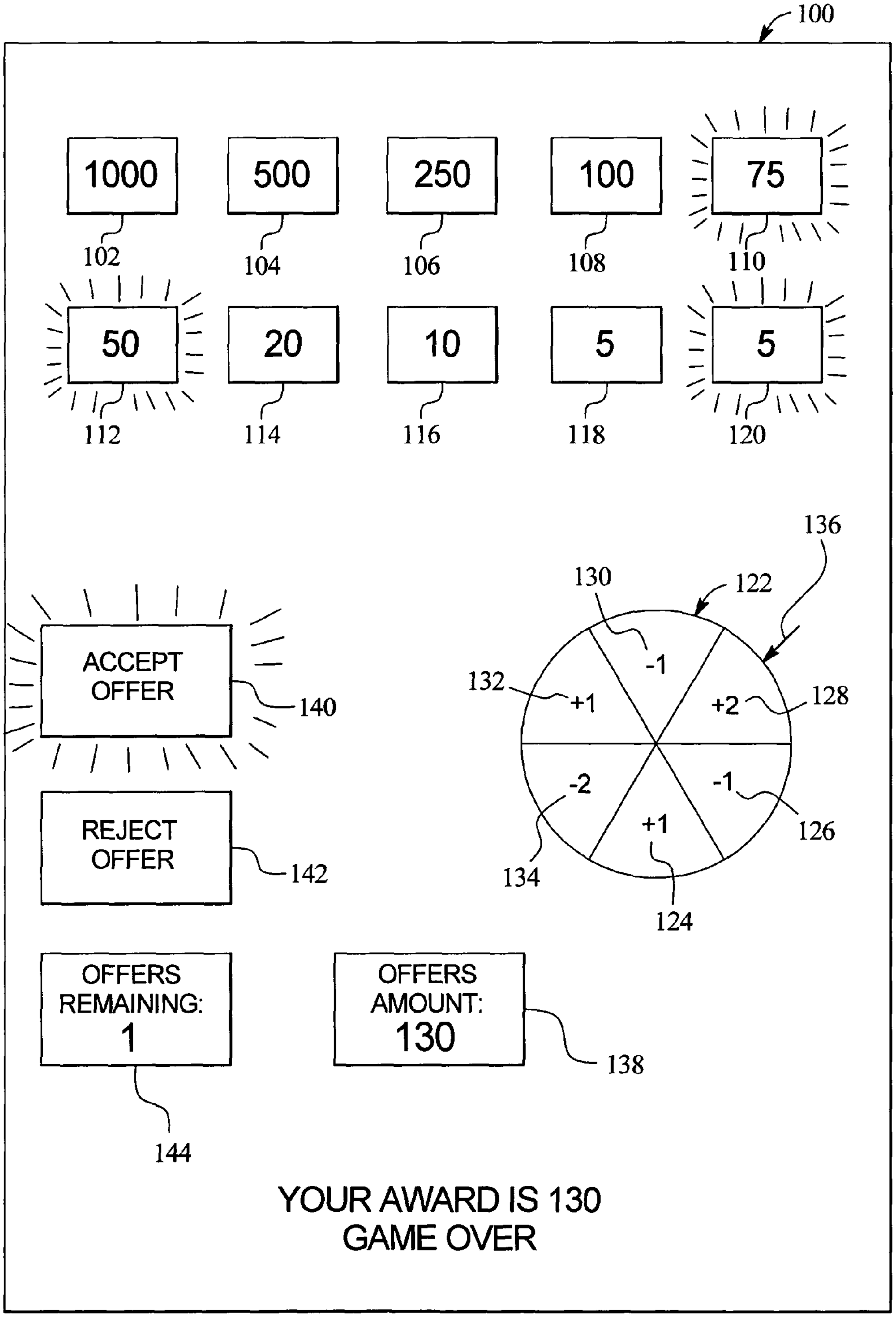

As illustrated in FIG. 3G, the player selected the highlighted accept offer selector 140 to accept the subsequent offer amount of one-hundred thirty. Accordingly, an award of one-hundred thirty credits, coins or tokens is provided to the player. Appropriate messages such as "YOUR AMOUNT IS 130" and "GAME OVER" are preferably provided to the player visually or through suitable audio or audiovisual displays and the offer acceptance game of the present invention ends.

Figure 4A:
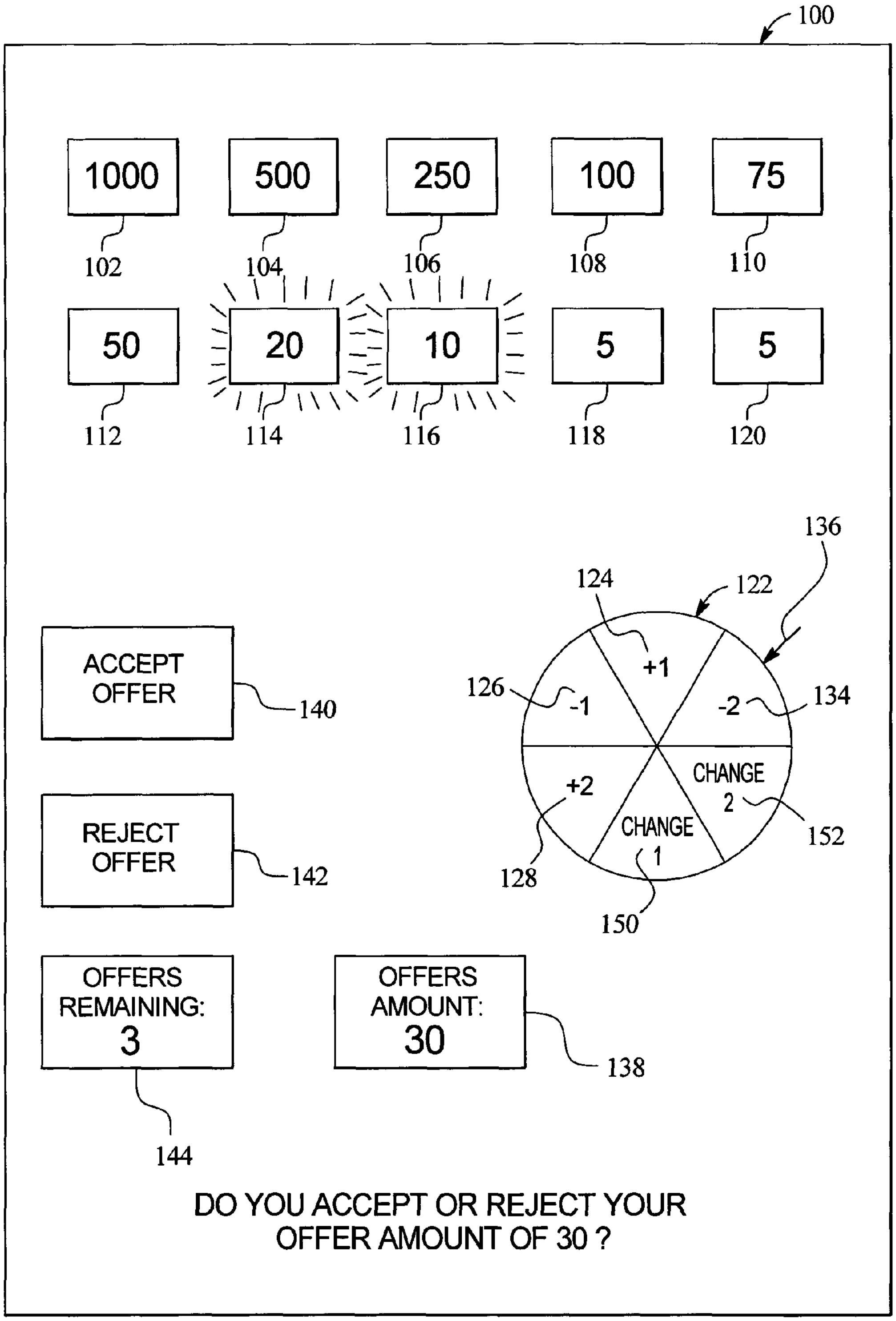
FIGS. 4A, 4B and 4C are front elevational views of an alternative embodiment of the present invention illustrating a player obtaining a plurality of offers wherein at least one offer is based on a plurality of selected offer components and a change selected component number modifier.

Referring to FIG. 4A, in an alternative embodiment of the present invention, one or more of the component number modifiers functions to change a number or amount of the previously selected offer components 150 and 152. That is, a number or amount of previously selected offer components are selected and replaced with newly selected offer components, wherein the number of replaced offer components is based on the number associated with the selected component number modifier. In other words, unlike the embodiment described above wherein a number of previously selected offer components are added or subtracted to form a subsequent offer, in this embodiment, the number of offer components that forms the subsequent offer will remain the same, but a number of the offer components will be changed or replaced with different, previously unselected offer components. In application, a number (based on the number associated with the selected component number modifier) of the previously selected offer components are chosen and deselected as described above regarding a component modifier which is associated with a negative number. This is followed by the selection of a number (based on the number associated with the selected component number modifier) of the remaining or unselected plurality of offer components as described above regarding a component modifier which is associated with a positive number. The award associated with each of the currently selected offer components are combined to form a new or subsequent offer. The gaming device enables the player to accept or reject this subsequent offer and the game proceeds as described above.

Figure 4B:
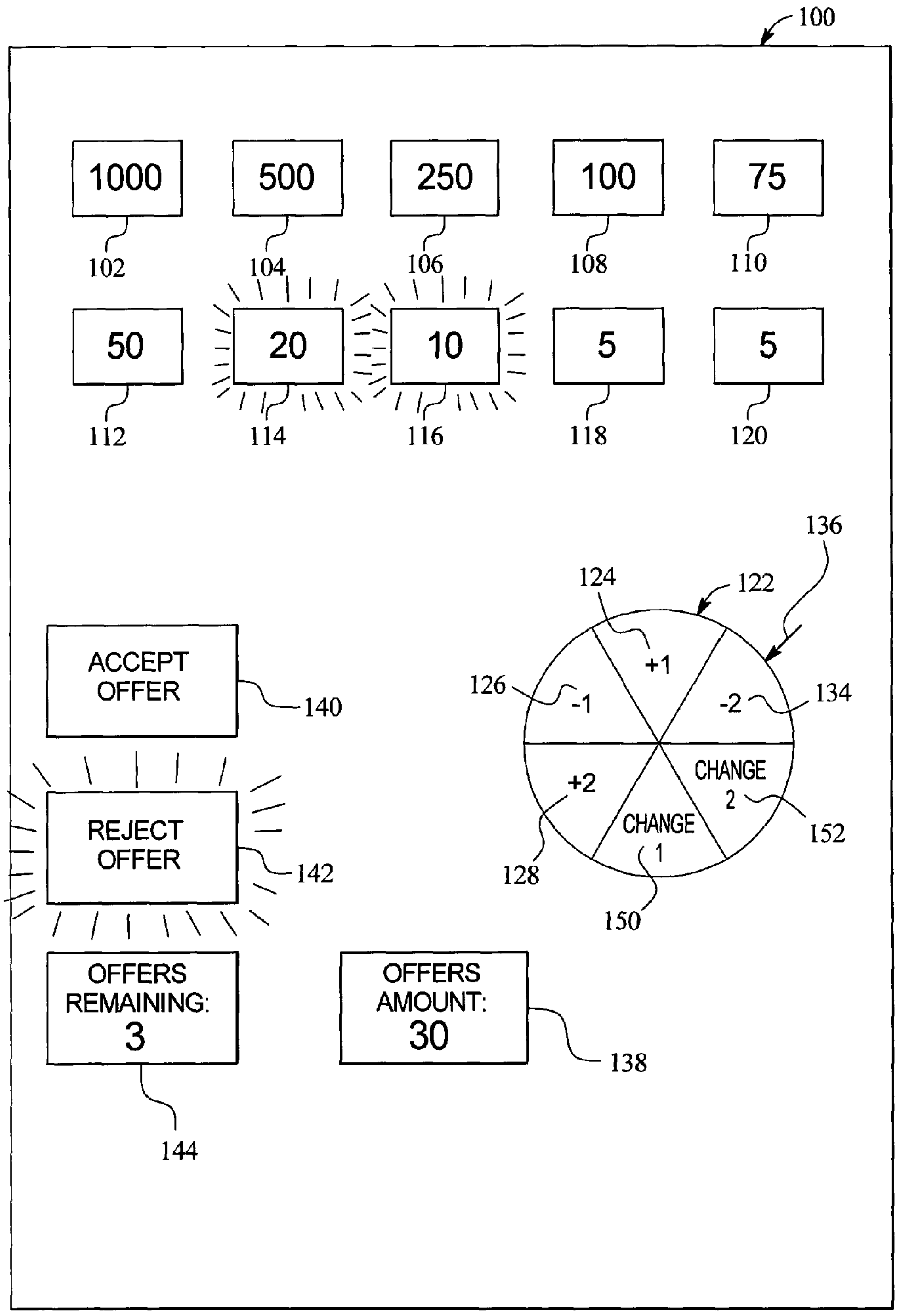

FIG. 4A illustrates this embodiment of the present invention wherein the player has been offered an offer of thirty that is based on selected offer component 114 which is associated with a value of twenty and selected offer component 116 which is associated with a value of ten. As illustrated in FIG. 4B, the player selected the highlighted reject offer selector 142 to reject the offer amount of thirty. As the rejected offer is not the last offer (i.e., the player has at least one offer remaining), the component number modifier generator 122 is activated to generate one of said plurality of component number modifiers.

Figure 4C:
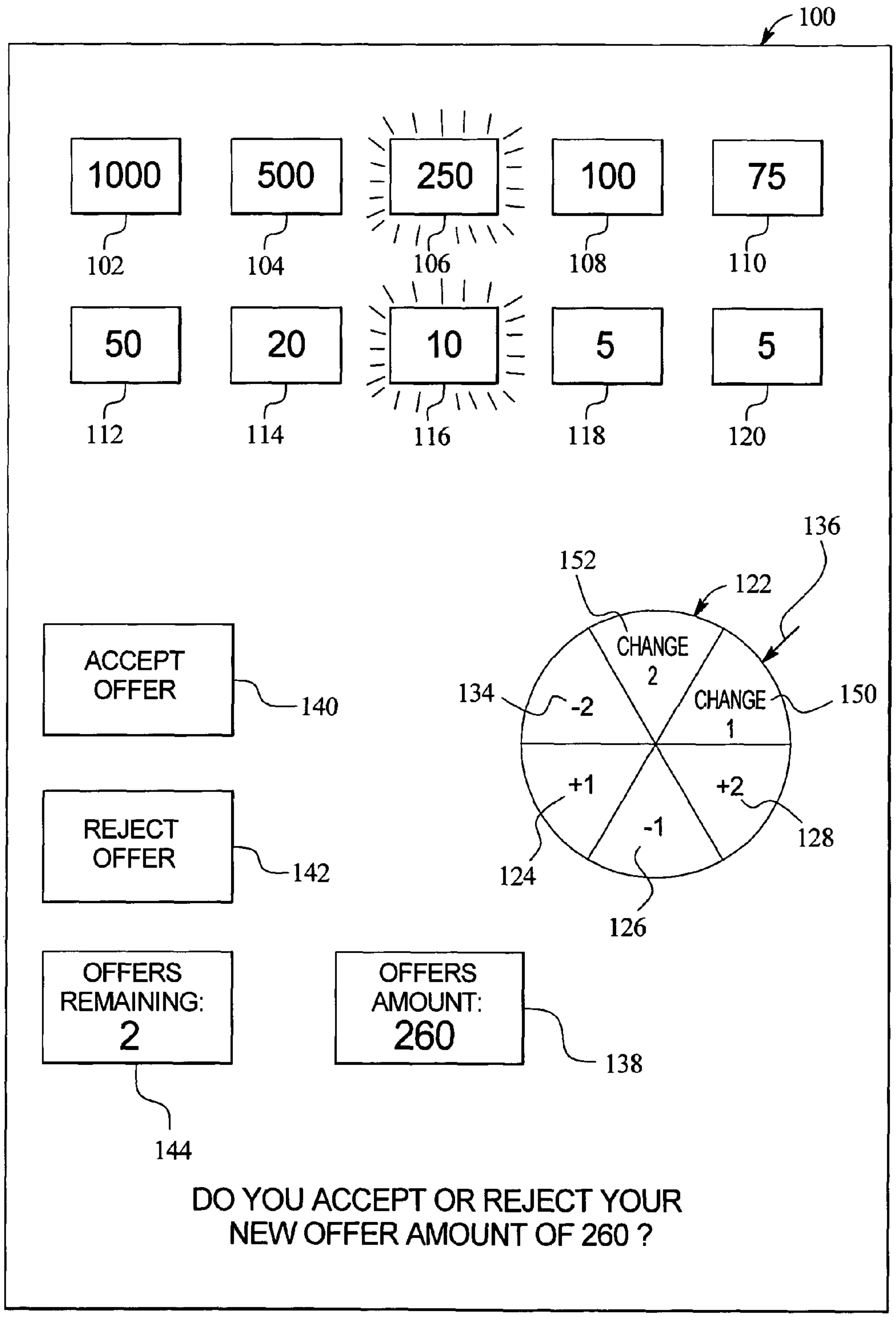

As illustrated in FIG. 4C, the component number modifier generator 122 generated or selected the component number modifier 150 that functions to change one (i.e., based on the associated value of one) of the previously selected offer components with a different one of the plurality of offer components. That is, one of the previously selected offer components is deselected and one of the remaining or unselected plurality of offer components is selected. The award or value associated with each of the currently selected offer components are combined to form a subsequent offer. In this case, the previously selected offer component 114 which is associated with an award or value of twenty is deselected and the previously unselected offer component 106 which is associated with an award or value of two-hundred and fifty is selected. The newly selected offer component 106 is combined with the other currently selected offer component 116 to from the subsequent offer of two-hundred and sixty which is displayed in the offer amount display 138. The subsequent offer is offered to player for acceptance or rejection and appropriate messages such as “DO YOU ACCEPT OR REJECT YOUR OFFER AMOUNT OF 260?” are preferably provided to the player visually or through suitable audio or audiovisual displays. The number of offers remaining 144 is reduced by one from three to two to reflect the subsequent offer. The offer acceptance game of this embodiment then proceeds as described above.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

a mechanical wheel including a plurality of sections;

at least one display device;

at least one input device;

at least one processor; and at least one memory device which stores a plurality of instructions, which when executed by the at least one processor, cause the at least one processor to operate with the at least one display device, the at least one input device, and said mechanical wheel, for a play of a game, to:

(a) display a plurality of offer components, wherein each of said offer components has an activated and a deactivated state, (b) select at least one offer component to activate from the plurality of displayed offer components, (c) thereafter, display at least one of a plurality of award values of at least one of a plurality of awards associated with at least one of the activated offer components, wherein each of the plurality of awards is statically associated with one of the offer components for the play of the game, each of said plurality of awards has an award value greater than zero, and a plurality of said award values have a same number of digits, (d) determine an offer based on a mathematical summation of the award values of all of the awards associated with the activated offer components, wherein said determined offer includes a plurality of activated offer components associated with the awards having award values with the same number of digits, (e) display said determined offer, (f) enable a player to accept or reject said determined offer, (g) provide said determined offer to the player if the player accepts said determined offer, and (h) if the player rejects said determined offer:

(1) cause said mechanical wheel to generate and display a selection of at least one of the sections of the mechanical wheel, wherein each section of the mechanical wheel is associated with one of a plurality of different displayed component number modifiers, and each component number modifier has a displayed value, (2) change the state of at least one of said plurality of offer components, wherein the number of offer components changing state is based on the value associated with the component number modifier of the selected section of the mechanical wheel, (3) determine a subsequent offer based on a mathematical summation of the award values of all of the awards associated with the currently activated offer components, wherein the award values of all of the awards associated with the currently activated offer components are each independent of the value associated with the component number modifier of the selected section of the mechanical wheel, and (4) display the determined subsequent offer to the player.

2. The gaming device of claim 1, wherein when executed by the at least one processor, said plurality of instructions cause the at least one processor to enables the player to accept or reject said determined subsequent offer.

3. The gaming device of claim 1, wherein said plurality of offer components are initially masked.

4. The gaming device of claim 3, wherein when executed by said at least one processor, said plurality of instructions cause the at least one processor to enable the player to activate at least one of said plurality of offer components.

5. The gaming device of claim 1, wherein each of said plurality of offer components is associated with a probability of being activated.

6. The gaming device of claim 5, wherein said probabilities are different based on the award associated with the offer component.

7. The gaming device of claim 6, wherein the greater the award associated with one of said offer components, the lower the probability of said offer component being activated.

8. The gaming device of claim 1, wherein when executed by the at least one processor, said plurality of instructions cause the at least one processor to select the award associated with each offer component from a range of awards.

9. The gaming device of claim 1, wherein each of said plurality of offer components is associated with a probability of being selected.

10. The gaming device of claim 9, wherein said probabilities are different based on the award associated with the offer component.

11. The gaming device of claim 10, wherein the greater the award associated with one of said offer components, the lower the probability of said offer component being selected.

12. A gaming device comprising:

at least one input device;

at least one display device configured to display a primary game operable upon a wager by a player;

a mechanical wheel including a plurality of sections, wherein after an occurrence of a triggering event associated with a play of said primary game:

(a) a plurality of offer components of a secondary game are displayed, wherein each of said offer components has an activated and a deactivated state;

(b) at least one offer component from the plurality of offer components is activated, (c) thereafter, at least one of a plurality of award values of at least one of a plurality of awards associated with at least one of the activated offer components is displayed, wherein each of the plurality of awards is statically associated with one of the offer components for a play of the secondary game, each of said plurality of awards has an award value greater than zero, and a plurality of said award values have a same number of digits, (d) an offer is determined based on a mathematical summation of the award values of all of the awards associated with the activated offer components, wherein said determined offer includes a plurality of activated offer components associated with the awards having award values with the same number of digits, (e) said determined offer is displayed, (f) the player is enabled to accept or reject said determined offer, (g) said determined offer is provided to the player if the player accepts said determined offer, and (h) if the player rejects said determined offer:

(1) a selection of at least one of the sections of the mechanical wheel is generated and displayed, wherein each section of the mechanical wheel is associated with one of a plurality of displayed component number modifiers, and each component number modifier has a displayed value, (2) the state of at least one offer component is changed, wherein the number of changed offer components is based on the value associated with the component number modifier of the selected section of the mechanical wheel, (3) a subsequent offer is determined based on a mathematical summation of the award values of all of the awards associated with the currently activated offer components, wherein the award values of all the awards associated with the currently activated offer components are each independent associated with the value of the component number modifier of the selected section of the mechanical wheel, and (4) the determined subsequent offer is displayed to the player.

13. The gaming device of claim 12, wherein the player is enabled to accept or reject said determined subsequent offer.

14. The gaming device of claim 12, wherein said plurality of offer components are initially masked.

15. The gaming device of claim 12, wherein each of said plurality of offer components is associated with a probability of being activated.

16. The gaming device of claim 15, wherein said probabilities are different based on the award associated with the offer component.

17. The gaming device of claim 16, wherein the greater the award associated with one of said offer components, the lower the probability of said offer component being activated.

18. The gaming device of claim 12, wherein the award associated with each offer component is selected from a range of awards.

19. A gaming device comprising:

a mechanical wheel including a plurality of sections;

at least one display device; and at least one input device;

at least one processor; and at least one memory device which stores a plurality of instructions, which when executed by the at least one processor, cause the at least one processor to operate with the at least one display device, the at least one input device, and said mechanical wheel, for a play of a game, to:

(a) display a plurality of offer components, (b) select at least one offer component from the plurality of offer components, (c) thereafter, display at least one of a plurality of award values of at least one of a plurality of awards associated with at least one of the selected offer components, wherein each of the plurality of awards is statically associated with one of the offer components for the play of the game, each of said plurality of awards has an award value greater than zero, and a plurality of said award values have a same number of digits, (d) determine an initial offer based on a mathematical summation of the award values of all of the awards associated with the selected offer components, wherein said determined initial offer includes a plurality of selected offer components associated with the awards having award values with the same number of digits, (e) display said determined initial offer, (f) enable a player to accept or reject said determined initial offer, (g) provide said determined initial offer to the player if the player accepts said determined initial offer, and (h) if the player rejects said determined initial offer:

(1) cause said mechanical wheel to generate and display a selection of at least one of the sections of the mechanical wheel, wherein each section of the mechanical wheel is associated with one of a plurality of different displayed component number modifiers, and each component number modifier has a displayed value, (2) change the selection of a number of said selected offer components, wherein the number of changed selected offer components is at least one and is based on the value associated with the component number modifier of the selected section of the mechanical wheel, (3) determine a subsequent offer based on a mathematical summation of the award values of all of the awards associated with the currently selected offer components, wherein the award values of all of the awards associated with the currently selected offer components are each independent of the value associated with the component number modifier of the selected section of the mechanical wheel, and (4) display the determined subsequent offer to the player.

20. The gaming device of claim 19, wherein when executed by the at least one processor, said plurality of instructions cause the at least one processor to enables the player to accept or reject said subsequent offer.

21. The gaming device of claim 19, wherein said plurality of offer components are initially masked.

22. The gaming device of claim 21, wherein when executed by said at least one processor, said plurality of instructions cause the at least one processor to enable the player to select at least one of said plurality of offer components.

23. The gaming device of claim 19, wherein when executed by the at least one processor, said plurality of instructions cause the at least one processor to select the award associated with each offer component from a range of awards.

24. The gaming device of claim 19, which when executed by the at least one processor, said plurality of instructions cause the at least one processor to operate with a component number modifier selector to select at least one of the component number modifiers if the player rejects said offer.

25. The gaming device of claim 24, wherein when executed by the at least one processor, said plurality of instructions cause the at least one processor to select said component number modifier selector from the group consisting of lights, buttons, wheels, reels, dice and cards.

26. A gaming device comprising:

at least one input device;

at least one display device configured to display a primary game operable upon a wager by a player;

a mechanical wheel including a plurality of sections, wherein after an occurrence of a triggering event associated with a play of a primary game:

(a) a plurality of offer components of a secondary game are displayed, (b) at least one offer component is selected from the plurality of offer components, (c) thereafter, at least one of a plurality of award values of at least one of a plurality of awards associated with at least one of the selected offer components is displayed, wherein each of the plurality of awards is statically associated with one of the offer components for a play of the secondary game, each of said plurality of awards has an award value greater than zero, and a plurality of said award values have a same number of digits, (d) an initial offer is determined based on a mathematical summation of the award values of all of the awards associated with the selected offer components, wherein said determined initial offer includes a plurality of selected offer components associated with the awards having award values with the same number of digits, (e) said determined initial offer is displayed, (f) the player is enabled to accept or reject said determined initial offer, (g) said determined initial offer is provided to the player if the player accepts said determined initial offer, and (h) if the player rejects said determined initial offer:

(1) a selection of at least one of the sections of the mechanical wheel is generated and displayed, wherein each section of the mechanical wheel is associated with one of a plurality of displayed component number modifiers, and each component number modifier has a displayed value, (2) the selection of a number of said selected offer components are changed, wherein the number of changed offer components is at least one and is based on the value associated with the component number modifier of the selected section of the mechanical wheel, (3) a subsequent offer is determined based on a mathematical summation of the award values of all of the awards associated with the currently selected offer components, wherein the award values of all of the awards associated with the currently selected offer components are each independent of the value associated with the component number modifier of the selected section of the mechanical wheel, and (4) the subsequent offer is displayed revealed to the player.

27. The gaming device of claim 26, wherein the player is enabled to accept or reject said determined subsequent offer.

28. The gaming device of claim 26, wherein said plurality of offer components are initially masked.

29. The gaming device of claim 26, wherein each of said plurality of offer components is associated with a probability of being selected.

30. The gaming device of claim 29, wherein said probabilities are different based on the award associated with the offer component.

31. The gaming device of claim 30, wherein the greater the award associated with one of said offer components, the lower the probability of said offer component being selected.

32. The gaming device of claim 26, wherein when executed by the at least one processor, said plurality of instructions cause the at least one processor to select the award associated with each offer component is selected from a range of awards.

33. A gaming device comprising:

a mechanical wheel including a plurality of sections;

at least one display device;

at least one input device;

at least one processor; and at least one memory device which stores a plurality of instructions, which when executed by the at least one processor, cause the at least one processor to operate with the at least one display device, the at least one input device, and said mechanical wheel, for a play of a game, to:

(a) display a plurality of offer components, (b) select at least one offer component from the plurality of offer components, (c) thereafter, display at least one of a plurality of award values of at least one of a plurality of awards associated with at least one of the selected offer components, wherein each of the plurality of awards is statically associated with one of the offer components for the play of the game, each of said plurality of awards has an award value greater than zero, and a plurality of said award values have a same number of digits, (d) determine an offer based on a mathematical summation of the award values of all of the awards associated with the selected offer components, wherein said determined offer includes a plurality of selected offer components associated with the awards having award values with the same number of digits, (e) display said determined offer, (f) enable a player to accept or reject said determined offer, (g) provide said determined offer to the player if the player accepts said determined offer, and (h) if the player rejects said determined offer:

(1) cause said mechanical wheel to generate and display a selection of at least one of the sections of the mechanical wheel, wherein each section of the mechanical wheel displays one of a plurality of different displayed component number modifiers, and at least one of the component number modifiers is associated with a displayed positive value and at least one of the component number modifiers is associated with a displayed negative value, (2) select at least one offer component from said plurality of offer components if the component number modifier of the selected section of the mechanical wheel is associated with a positive value wherein the number of offer components selected is based on the associated positive value, (3) deselect at least one of said selected offer components if the component number modifier of the selected section of the mechanical wheel is associated with a negative value wherein the number of deselected offer components is based on the associated negative value, (4) determine a subsequent offer based on a mathematical summation of the award values of all of the awards associated with the currently selected offer components, wherein the award values of all of the awards associated with the currently selected offer components are each independent of the value associated with the component number modifier of the selected section of the mechanical wheel, and (5) display the determined subsequent offer to the player.

34. The gaming device of claim 33, wherein when executed by the at least one processor, said plurality of instructions cause the at least one processor to enable the player to accept or reject said subsequent offer.

35. The gaming device of claim 33, wherein said plurality of offer components are initially masked.

36. The gaming device of claim 35, wherein when executed by said at least one processor, said plurality of instructions cause the at least one processor to enable the player to select at least one of said plurality of offer components.

37. The gaming device of claim 33, wherein each of said plurality of offer components is associated with a probability of being selected.

38. The gaming device of claim 37, wherein said probabilities are different based on the award associated with the offer component.

39. The gaming device of claim 37, wherein the greater the award associated with one of said offer components, the lower the probability of said offer component being selected.

40. The gaming device of claim 33, wherein when executed by the at least one processor, said plurality of instruction cause the at least one processor to select the award associated with each offer component from a range of awards.

41. The gaming device of claim 33, wherein when executed by the at least one processor, said plurality of instructions cause the at least one processor to select the value associated with each component number modifier from a range of values.

42. The gaming device of claim 33, wherein each of said plurality of component number modifiers is associated with a probability of being selected.

43. A gaming device comprising:

at least one input device;

at least one display device configured to display a primary game operable upon a wager by a player;

a mechanical wheel including a plurality of sections, wherein after an occurrence of a triggering event associated with a play of a primary game:

(a) a plurality of offer components of a secondary game are displayed;

(b) at least one offer component is selected from the plurality of offer components;

(c) thereafter, at least one of a plurality of award values of at least one of a plurality of awards associated with at least one of the selected offer components is displayed, wherein each of the plurality of awards is statically associated with one of the offer components for a play of the secondary game, each of said plurality of awards has an award value greater than zero, and a plurality of said award values have a same number of digits;

(d) an offer is determined based on a mathematical summation of the award values of all of the awards associated with the selected offer components, wherein said determined offer includes a plurality of selected offer components associated with the awards having award values with the same number of digits;

(e) said determined offer is displayed;

(f) the player is enabled to accept or reject said determined offer;

(g) said determined offer is provided to the player if the player accepts said determined offer; and (h) if the player rejects said determined offer:

(1) a selection of at least one of the sections of the mechanical wheel is generated and displayed, wherein each section of the mechanical wheel is associated with one of a plurality of different displayed component number modifiers, and at least one of the component number modifiers is associated with a displayed positive value and at least one of the component number modifiers is associated with a displayed negative value;

(2) at least one offer component from said plurality of offer components is selected if the component number modifier of the selected section of the mechanical wheel is associated with a positive value wherein the number of offer components selected is based on the associated positive value;

(3) at least one of said selected offer components of said rejected offer is deselected if the component number modifier of the selected section of the mechanical wheel is associated with a negative value wherein the number of deselected offer components is based on the associated negative value;

(4) a subsequent offer is determined based on a mathematical summation of the award values of all of the awards associated with the currently selected offer components, wherein the award values of all of the awards associated with the currently selected offer components are each independent of the value associated with the component number modifier of the selected section of the mechanical wheel; and (5) the determined subsequent offer is displayed to the player.

44. The gaming device of claim 43, wherein the player is enabled to accept or reject said determined subsequent offer.

45. The gaming device of claim 43, wherein said plurality of offer components are initially masked.

46. The gaming device of claim 45, wherein the player is enabled to select at least one of said plurality of offer components.

47. The gaming device of claim 43, wherein each of said plurality of offer components is associated with a probability of being selected.

48. The gaming device of claim 47, wherein said probabilities are different based on the award associated with the offer component.

49. The gaming device of claim 48, wherein the greater the award associated with one of said offer components, the lower the probability of said offer component being selected.

50. A gaming device comprising:

a mechanical wheel including a plurality of sections;

at least one display device;

at least one input device;

at least one processor; and at least one memory device which stores a plurality of instructions, which when executed by the at least one processor, cause the at least one processor to operate with the at least one display device, the at least one input device, and said mechanical wheel, for a play of a game, to:

(a) display a plurality of offer components;

(b) select at least one offer component from the plurality of offer components;

(c) thereafter, display at least one of a plurality of award values of at least one of a plurality of awards associated with at least one of the selected offer components, wherein each of the plurality of awards is statically associated with one of the offer components for the play of the game, each of said plurality of awards has an award value greater than zero, and a plurality of said award values have a same number of digits;

(d) determine an offer based on a mathematical summation of the award values of all of the awards associated with the selected offer components, wherein said determined offer includes a plurality of selected offer components associated with the awards having award values with the same number of digits;

(e) display said determined offer;

(f) enable a player to accept or reject said determined offer;

(g) provide said determined offer to the player if the player accepts said determined offer; and (h) if the player rejects said determined offer:

(1) cause said mechanical wheel to generate and display a selection of at least one of the sections of the mechanical wheel, wherein each section of the mechanical wheel is associated with one of a plurality of different displayed component number modifiers, and each component number modifier has a displayed value;

(2) select at least one of the unselected offer components from said plurality of offer components or deselect at least one of the selected offer components wherein the number of offer components selected or deselected is based on the value associated with the component number modifier of the selected section of the mechanical wheel;

(3) determine a subsequent offer based on a mathematical summation of the award values of all of the awards associated with the currently selected offer components, wherein the award values of all of the awards associated with the currently selected offer components are each independent of the value of the component number modifier of the selected section of the mechanical wheel;

(4) display the determined subsequent offer; and (5) enable the player to accept or reject said determined subsequent offer.

51. A gaming device comprising:

at least one input device;

at least one display device configured to display a primary wagering game operable upon a wager by a player;

a mechanical wheel including a plurality of sections, wherein after an occurrence of a triggering event associated with a play of a primary game:

(a) a plurality of offer components of a secondary game are displayed;

(b) at least one offer component is selected from the plurality of offer components;

(c) thereafter, at least one of a plurality of award values of at least one of a plurality of awards associated with at least one of the selected offer components is displayed, wherein each of the plurality of awards is statically associated with one of the offer components for a play of the secondary game, each of said plurality of awards has an award value greater than zero, and a plurality of said award values have a same number of digits;

(d) an offer is determined based on a mathematical summation of the award values of all of the awards associated with the selected offer components, wherein said determined offer includes a plurality of activated offer components associated with the awards having award values with the same number of digits;

(e) said determined offer is displayed;

(f) the player is enabled to accept or reject said determined, offer;

(g) said determined offer is provided to the player if the player accepts said determined offer; and (h) if the player rejects said determined offer:

(1) a selection of at least one of the sections of the mechanical wheel is generated and displayed, wherein each section of the mechanical wheel is associated with one of a plurality of different displayed component number modifiers, and each component number modifier has a displayed value;

(2) at least one of the unselected offer components from said plurality of offer components is selected or at least one of the selected offer components is deselected wherein the number of offer components selected or deselected is based on the value associated with the component number modifier of the selected section of the mechanical wheel;

(3) a subsequent offer is determined based on a mathematical summation of the award values of all of the awards associated with the currently selected offer components, wherein the award values of all of the awards associated with the currently selected offer components are each independent of the value associated with the component number modifier of the selected section of the mechanical wheel;

(4) the determined subsequent offer is displayed; and (5) the player is enabled to accept or reject said determined subsequent offer.

52. A gaming device comprising:

a mechanical wheel including a plurality of sections;

at least one display device;

at least one input device;

at least one processor; and at least one memory device which stores a plurality of instructions, which when executed by the at least one processor, cause the at least one processor to operate with the at least one display device, the at least one input device, and said mechanical wheel, for a play of a game, to:

(a) display a plurality of offer components;

(b) select at least one offer component from the plurality of offer components;

(c) thereafter, display at least one of a plurality of award values of at least one of a plurality of awards associated with at least one of the selected offer components, wherein each of the plurality of awards is statically associated with one of the offer components for the play of the game, each of said plurality of awards has an award value greater than zero, and a plurality of said award values have a same number of digits, (d) determine an offer based on a mathematical summation of the award values of all of the awards associated with the selected offer components, wherein said determined offer includes a plurality of selected offer components associated with the awards having award values with the same number of digits;

(e) display said determined offer;

(f) enable a player to accept or reject said determined offer;

(g) provide said determined offer to the player if the player accepts said determined offer; and (h) if the player rejects said determined offer:

(1) cause said mechanical wheel to generate and display a selection of at least one of the sections of the mechanical wheel, wherein each section of the mechanical wheel is associated with one of a plurality of displayed component number modifiers, and at least one of said component number modifiers is associated with a displayed positive value and at least one of said component number modifiers is a change component modifier associated with a displayed value;

(2) select at least one offer component from said plurality of offer components if the component number modifier of the selected section of the mechanical wheel is associated with a positive value wherein the number of offer components selected is based on the associated positive value;

(3) change at least one of the selected offer components by deselecting at least one of the selected offer components and selecting at least one of said unselected offer component from the plurality of offer components if said component number modifier of the selected section of the mechanical wheel is associated with said change component modifier wherein the number of changed offer components is based on the value associated with the change component modifier; and (4) determine and display a subsequent offer based on a mathematical summation of the award values of all of the awards associated with the currently selected offer components, wherein the award values of all of the awards associated with the currently selected offer components are each independent of the value associated with the component number modifier of the selected section of the mechanical wheel.

53. The gaming device of claim 52, wherein at least one of said component number modifiers is associated with a negative value.

54. The gaming device of claim 53, wherein when executed by the at least one processor, said plurality of instructions cause said at least one processor is programmed to deselect at least one of said selected offer components if the selected component number modifier is associated with the negative value wherein the number of selected offer components deselected is based on the associated negative value.

55. The gaming device of claim 52, wherein when executed by said at least one processor, said plurality of instructions cause the at least one processor to enable the player to accept or reject said determined subsequent offer.

56. A gaming device comprising:

at least one input device;

at least one display device configured to display a primary wagering game operable upon a wager by a player;

a mechanical wheel including a plurality of sections, wherein after an occurrence of a triggering event associated with a play of a primary game:

(a) a plurality of offer components of a secondary game are displayed;

(b) at least one offer component is selected from the plurality of offer components;

(c) thereafter, at least one of a plurality of award values of at least one of a plurality of awards associated with at least one of the selected offer components is displayed, wherein each of the plurality of awards is statically associated with one of the offer components for a play of the secondary game, each of said plurality of awards has an award value greater than zero, and a plurality of said award values have a same number of digits;

(d) an offer is determined based on a mathematical summation of the award values of all of the awards associated with the selected offer components, wherein said determined offer includes a plurality of selected offer components associated with the awards having award values with the same number of digits;

(e) said determined offer is displayed;

(f) the player is enabled to accept or reject said determined offer;

(g) said determined offer is provided to the player if the player accepts said determined offer; and (h) if the player rejects said determined offer:

(1) a selection of at least one of the sections of the mechanical wheel is generated and displayed, wherein each section of the mechanical wheel is associated with one of a plurality of displayed component number modifiers, and at least one of said component number modifiers is associated with a displayed positive value and at least one of said component number modifiers is a change component modifier associated with a displayed value;

(2) at least one offer component is selected from said plurality of offer components if the component number modifier of the selected section of the mechanical wheel is associated with a positive number wherein the number of offer components selected is based on the associated positive value;

(3) at least one of the selected offer components that forms the rejected offer is deselected and at least one of said unselected offer components is selected from the plurality of offer components if said component number modifier of the selected section of the mechanical wheel is associated with said change component modifier wherein the number of changed selected offer components is based on the value associated with the change component modifier; and (4) a subsequent offer is determined and displayed based on a mathematical summation of the award values of all of the awards associated with the modified selected offer components, wherein the award values of all of the awards associated with the modified selected offer components are each independent of the value associated with the component number modifier of the selected section of the mechanical wheel.

57. The gaming device of claim 56, wherein at least one of said component number modifiers is associated with a negative value.

58. The gaming device of claim 57, wherein at least one of said selected offer components that forms the rejected offer is deselected if the selected component number modifier is associated with the negative value wherein the number of selected offer components deselected is based on the associated negative value.

59. The gaming device of claim 56, wherein the player is enabled to accept or reject said determined subsequent offer.

60. A gaming device comprising:

at least one display device; and at least one input device;

at least one processor; and at least one memory device which stores a plurality of instructions, which when executed by the at least one processor, cause the at least one processor to operate with the at least one display device and the at least one input device, for a play of a game, to:

(a) display a plurality of offer components, wherein each of said offer components has an activated and a deactivated state;

(b) activate at least one offer component from the plurality of offer components;

(c) thereafter, display at least one of a plurality award values of at least one of a plurality of awards associated with at least one of the activated offer components, wherein each of the plurality of awards is statically associated with one of the offer components for the play of the game, each of said plurality of awards has an award value greater than zero, and a plurality of said award values have a same number of digits;

(d) form an offer based on a mathematical summation of the award values of all of the awards associated with the activated offer components, wherein said determined offer includes a plurality of activated offer components associated with the awards having award values with the same number of digits;

(e) enable a player to accept or reject said offer;

(f) provide said offer to the player if the player accepts said offer; and (g) if the player rejects said offer:

(i) display a determination of at least one of a plurality of numbers of activated offer components to change;

(ii) change the state of said determined number of activated offer components; and (iii) form a subsequent offer based on a summation of the award values of all of the awards associated with the currently activated offer components, wherein the award values of all of the awards associated with the currently activated offer components are each independent of the determined number of activated offer components.

61. A gaming device comprising:

at least one input device;

at least one display device configured to display a primary wagering game operable upon a wager by a player;

upon an occurrence of a triggering event associated with a play of a primary game:

(a) a plurality of offer components of a secondary game are displayed, wherein each of said offer components has an activated and a deactivated state;

(b) at least one offer component from the plurality of offer components is activated;

(c) thereafter, at least one of a plurality of award values of at least one of a plurality of awards associated with at least one of the activated offer components is displayed, wherein each of the plurality of awards is statically associated with one of the offer components for a play of the secondary game, each of said plurality of awards has an award value greater than zero, and a plurality of said award values have a same number of digits;

(d) an offer is formed based on a mathematical summation of the award values of all of the awards associated with the activated offer components, wherein said determined offer includes a plurality of activated offer components associated with the awards having award values with the same number of digits;

(e) the player is enabled to accept or reject said offer;

(f) said offer is provided to the player if the player accepts said offer; and (g) if the player rejects said offer:

(i) a determination of at least one of a plurality of displayed numbers of activated offer components to change is displayed;

(ii) the state of said determined number of activated offer components is changed; and (iii) a subsequent offer is formed based on a mathematical summation of the award values of all of the awards associated with the currently activated offer components wherein the award values of all of the awards associated with the currently activated offer components are each independent of the determined number of activated offer components.

* * * * *

UNITED STATES PATENT AND TRADEMARK OFFICE

CERTIFICATE OF CORRECTION

PATENT NO. : 7,731,582 B2
APPLICATION NO. : 10/657442
DATED : June 8, 2010
INVENTOR(S) : Randall et al.

It is certified that error appears in the above-identified patent and that said Letters Patent is hereby corrected as shown below:

IN THE CLAIMS:

In Claim 2, column 18, line 57, replace "enables" with --enable--.

In Claim 12, column 20, line 1, replace "independent associated" with --independent of the value associated--.

In Claim 19, column 20, line 25, delete "and".

In Claim 20, column 21, line 16, replace "enables" with --enable--.

In Claim 26, column 22, line 21, delete "revealed".

In Claim 32, column 22, line 39, delete "is selected".

In Claim 40, column 23, line 57, replace "instruction" with --instructions--.

In Claim 54, column 27, line 65, delete "is programmed".

Signed and Sealed this

Thirty-first Day of August, 2010

David J. Kappos
*Director of the United States Patent and Trademark Office*